(12) United States Patent
Tapadia et al.

(10) Patent No.: US 10,425,032 B2
(45) Date of Patent: Sep. 24, 2019

(54) DRIVE SYSTEM AND METHOD OF OPERATION THEREOF FOR REDUCING DC LINK CURRENT RIPPLE

(71) Applicant: General Electric Company, Schenectady, NY (US)

(72) Inventors: Nidhishri Tapadia, Schenectady, NY (US); Kum-Kang Huh, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 244 days.

(21) Appl. No.: 15/449,609

(22) Filed: Mar. 3, 2017

(65) Prior Publication Data
US 2018/0251036 A1 Sep. 6, 2018

(51) Int. Cl.
*B60L 11/18* (2006.01)
*H02M 7/5387* (2007.01)
(Continued)

(52) U.S. Cl.
CPC .............. *H02P 27/08* (2013.01); *B60L 50/51* (2019.02); *H02M 1/12* (2013.01); *H02M 1/15* (2013.01);
(Continued)

(58) Field of Classification Search
CPC .............. B60L 11/1803; B60L 2210/10; B60L 2210/40; H02M 7/5395; H02M 3/158;
(Continued)

(56) References Cited

U.S. PATENT DOCUMENTS

| 5,706,186 A | * | 1/1998 | Blasko .............. H02M 7/53875 363/41 |
| 7,348,739 B2 | | 3/2008 | Urakabe et al. |

(Continued)

FOREIGN PATENT DOCUMENTS

WO 2016129592 A1 8/2016

OTHER PUBLICATIONS

Xi Lu et al. "A carrier modulation method for minimizing the Dc Link capacitor current ripple of the HEV DC-DC Converter and inverter systems", 2011 Twenty-Sixth Annual IEEE APEC, Mar. 6, 2011 (Year: 2011).*

(Continued)

*Primary Examiner* — Jared Fureman
*Assistant Examiner* — Michael J Warmflash
(74) *Attorney, Agent, or Firm* — Meagher Emanuel Laks Goldberg & Liao, LLP

(57) ABSTRACT

A system and method for operating a drive system coupleable to one or more DC and AC electrical ports is disclosed. The drive system includes a DC link, at least one DC-DC converter, at least one DC-AC converter, a DC link capacitor, and a control system configured to control operation of one or more of the at least one DC-DC converter and the at least one DC-AC converter relative to one another based on operational parameters thereof. In controlling operation of one or more of the at least one DC-DC converter and the at least one DC-AC converter, the control system controls at least one of a switching frequency of the at least one DC-DC converter, a switching frequency of the at least one DC-AC converter, a DC-DC converter carrier signal phase, a DC-AC converter carrier signal phase, and a duty cycle of the at least one DC-DC converter.

20 Claims, 15 Drawing Sheets

(51) Int. Cl.
    *H02P 27/08*     (2006.01)
    *H02M 1/12*     (2006.01)
    *H02M 1/15*     (2006.01)
    *H02M 3/158*     (2006.01)
    *H02M 7/5395*     (2006.01)
    *H02P 5/74*     (2006.01)
    *B60L 50/51*     (2019.01)

(52) U.S. Cl.
    CPC ......... *H02M 3/158* (2013.01); *H02M 7/5395* (2013.01); *H02M 7/53871* (2013.01); *H02P 5/74* (2013.01); *B60L 2210/10* (2013.01); *B60L 2210/40* (2013.01); *H02M 2003/1586* (2013.01)

(58) Field of Classification Search
    CPC ...... H02M 1/15; H02M 7/53871; H02M 1/12; H02M 2003/1586; H02P 5/74; H02P 27/08
    See application file for complete search history.

(56) References Cited

U.S. PATENT DOCUMENTS

| | | | |
|---|---|---|---|
| 7,408,794 | B2 | 8/2008 | Su |
| 7,675,192 | B2 | 3/2010 | Tang et al. |
| 7,800,921 | B2 | 9/2010 | Zhu et al. |
| 8,339,089 | B2 | 12/2012 | Suzuki |
| 9,071,141 | B2 | 6/2015 | Dong et al. |
| 2006/0152085 | A1 | 7/2006 | Flett et al. |
| 2009/0069142 | A1* | 3/2009 | Welchko ................ B60K 6/445 475/276 |
| 2012/0155139 | A1* | 6/2012 | Boeke ................ H02M 3/1584 363/131 |
| 2014/0232309 | A1* | 8/2014 | Zhou ........................ H02P 27/08 318/400.02 |
| 2015/0311819 | A1 | 10/2015 | Matsumoto |
| 2016/0118925 | A1 | 4/2016 | Kim |

OTHER PUBLICATIONS

Di Napoli et al.,"Multiple Input DC-DC Power Converter for Fuel-Cell Powered Hybrid Vehicles", 2002 IEEE 33rd Annual Power Electronics Specialists Conference, Jun. 23-27, 2002, pp. 1685-1690, Cairns.

Nishida et al.,"A Novel Type of Utility-Interactive Inverter for Photovoltaic System", The 4th International Power Electronics and Motion Control Conference, vol. 3, Aug. 14-16, 2004, pp. 1785-1790.

Lu et al.,"A Carrier Modulation Method for Minimizing the DC Link Capacitor Current Ripple of the HEV DC-DC Converter and Inverter Systems", 2011 Twenty-Sixth Annual IEEE Applied Power Electronics Conference and Exposition (APEC), Mar. 6-11, 2011, pp. 800-807.

Su et al.,"A Segmented Traction Drive System with a Small DC Bus Capacitor", 2012 IEEE Energy Conversion Congress and Exposition (ECCE), Sep. 15-20, 2012, pp. 2847-2853, Raleigh.

Enjeti et al., "Programmed PWM Techniques to Eliminate Harmonics: A Critical Evaluation," IEEE Transactions on Industry Applications, vol. 26, No. 2, Mar./Apr. 1990, pp. 302-316.

Hava et al., "A High-Performance Generalized Discontinuous PWM Algorithm," IEEE Transactions on Industry Applications, vol. 34, No. 5, Sep./Oct. 1998, pp. 1059-1071.

Sudhoff et al., "Operating Modes of the Brushless DC Motor with a 120 Degree Inverter," IEEE Transactions on Energy Conversion, vol. 5, No. 3, Sep. 1990, pp. 558-564.

Patel et al., "Generalized Techniques of Harmonic Elimination and Voltage Control in Thyristor Inverters: Part I—Harmonic Elimination," IEEE Transactions on Industry Applications, vol. IA-9, No. 3, May/Jun. 1973, pp. 310-317.

Lu, X., et al., "A Carrier Modulation Method for Minimizing the DC Link Capacitor Current Ripple of the HEV DC-DC Converter and Inverter Systems," Twenty-Sixth Annual IEEE Applied Power Electronics Conference and Exposition (APEC), pp. 800-807 (Mar. 6, 2011).

International Search Report and Written Opinion issued in connection with corresponding PCT Application No. PCT/US2018/016964 dated May 21, 2018.

* cited by examiner

DRIVE SYSTEM AND METHOD OF OPERATION THEREOF FOR REDUCING DC LINK CURRENT RIPPLE

BACKGROUND OF THE INVENTION

The present invention relates generally to DC-DC and DC-AC power conversion in AC drive systems and, more particularly, to a system and method for reducing DC link current ripple in such drive systems.

Purely electric vehicles use stored electrical energy to power an electric motor, which propels the vehicle and may also operate auxiliary drives. Purely electric vehicles may use one or more sources of stored electrical energy. For example, a first source of stored electrical energy may be used to provide longer-lasting energy while a second source of stored electrical energy may be used to provide higher-power energy for, for example, acceleration.

Hybrid electric vehicles may combine an internal combustion engine and an electric motor powered by an energy storage device, such as a traction battery, to propel the vehicle. Such a combination may increase overall fuel efficiency by enabling the combustion engine and the electric motor to each operate in respective ranges of increased efficiency. Electric motors, for example, may be efficient at accelerating from a standing start, while combustion engines may be efficient during sustained periods of constant engine operation, such as in highway driving. Having an electric motor to boost initial acceleration allows combustion engines in hybrid vehicles to be smaller and more fuel efficient.

In energy systems of hybrid and electric vehicles, energy is transferred from the energy storage device to a DC link, with the DC link being electrically coupled to a DC-AC inverter and the electric motor. Often, a bi-directional boost converter is coupled to the DC link to boost voltage from the energy storage device on a low voltage side of the energy system to a higher level voltage on a high voltage side of the energy system for supply to the DC-AC inverter. A typical system involving a battery, DC-DC converter, DC-AC inverter and motor is shown in FIG. 1. As seen therein, a DC link capacitor is required to absorb current ripple created during the inversion from DC to AC. The DC link capacitor is a critical and bulky component of the system, and the DC link capacitor is typically sized for the maximum ripple current it sees—with the life of the capacitor depending on the current through it over time. In automotive applications where the ambient temperature is high, reduction in capacitor ripple current is crucial.

However, while it is recognized that reducing the capacitor size and increasing its life is crucial in low cost, compact power conversion applications, not much work has been done in the area of capacitor minimization with DC-DC-AC power conversion schemes. In work done to date for such capacitor minimization, prior art advancements have obtained ripple reduction for only a very narrow band of duty ratio, used a bang-bang controller to reduce ripple current and reduce capacitor size at the expense of having a larger DC voltage ripple, and/or by using two inverters to cancel the current ripple, such that a motor with segmented windings or two separate motors are required.

It would therefore be desirable to provide a system and method for reducing DC link current ripple in a drive system that includes a DC-DC converter and DC-AC inverter. Reduction of the DC link current ripple would allow for the reduction of the DC link capacitor size and increase the life of the capacitor.

BRIEF DESCRIPTION OF THE INVENTION

In accordance with one aspect of the invention, a drive system coupleable to one or more DC electrical ports to condition power received from the one or more DC electrical ports or provided to the one or more DC electrical ports and coupleable to one or more AC electrical ports to condition power provided to the one or more AC electrical ports or received from the one or more AC electrical ports is provided. The drive system includes a DC link, at least one DC-DC converter electrically coupled to the DC link and to the one or more DC electrical ports to perform a DC-DC power conversion, at least one DC-AC converter electrically coupled to the DC link and to the one or more AC electrical ports to perform DC-AC power conversion and optionally perform AC-DC power conversion, a DC link capacitor electrically coupled to the DC link between the DC-DC converter and the DC-AC converter to absorb current ripple, and a control system operably connected to the DC-DC converter and the DC-AC converter, the control system configured to control operation of one or more of the at least one DC-DC converter and the at least one DC-AC converter relative to one another based on operational parameters of each of the at least one DC-DC converter and the at least one DC-AC converter, so as to reduce the current ripple across the DC link capacitor, with the operational parameters of each of the at least one DC-DC converter and the at least one DC-AC converter comprising one or more of a modulation method of the at least one DC-AC converter, a number of phases of the at least one DC-DC converter, a power factor of the one or more AC electrical ports, a duty cycle of the at least one DC-DC converter, a switching frequency of the at least one DC-DC converter, a fundamental frequency of the one or more AC electrical ports, a modulation index of the at least one DC-AC converter, and a switching frequency of the at least one DC-AC converter. In controlling operation of one or more of the at least one DC-DC converter and the at least one DC-to-AC converter, the control system controls at least one of a switching frequency of the at least one DC-DC converter, a switching frequency of the at least one DC-AC converter, a DC-DC converter carrier signal phase, a DC-AC converter carrier signal phase, and a duty cycle of the at least one DC-DC converter.

In accordance with another aspect of the invention, a method of operating a drive system for driving one or more AC electrical ports while reducing DC link current ripple includes operating at least one DC-DC converter electrically coupled to a DC link to modify a first DC power received from an energy source or energy storage device, so as to output a second DC power. The method also includes operating at least one DC-to-AC inverter electrically coupled to the DC link to invert the second DC power to an AC power provided to the one or more AC electrical ports and modifying the operation of one or more of the at least one DC-DC converter and the at least one DC-to-AC inverter based on operational parameters of each of the at least one DC-DC converter and the at least one DC-to-AC inverter, so as to minimize a current ripple on the DC link and across a DC link capacitor coupled to the DC link, wherein modifying the operation of one or more of the at least one DC-DC converter and the at least one DC-to-AC inverter comprises implementing one or more of: a phase shift between a DC-DC converter carrier signal and an AC-DC inverter carrier signal, modifying a switching frequency of the at least one DC-DC converter, and modifying a duty cycle of the at least one DC-DC converter.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION OF THE PREFERRED EMBODIMENTS

The embodiments of the invention set forth herein relate to a drive system and method of operation thereof that reduces DC link current ripple across a DC link capacitor in the drive system. Operation of one or more of a DC-DC converter and DC-AC inverter in the drive system is controlled to provide such reduction in the current ripple, with a switching frequency of the DC-DC converter, a DC-DC converter carrier signal phase, an AC-DC inverter carrier signal phase, and/or a duty cycle pulse pattern of the DC-DC converter being changed or altered in order to effect the reduction in the DC link capacitor current ripple.

While embodiments of the invention are described here below primarily in the context of a drive system used in a traction drive system in an automotive environment (i.e., a vehicle propulsion system), it is recognized that embodiments of the invention are useable with and may be employed in various types of drive systems. That is, embodiments of the invention are directed toward any type of variable frequency drive system that requires the use of an inverter to generate AC waveforms with variable voltage and frequency from a DC source, with such AC waveforms being provided to an AC electrical port to which an AC electrical machine, grid, or other load, may be connected. Embodiments of the invention are also directed toward any combination of multiple drive systems that drive multiple AC electrical ports using the same DC link. Still further, embodiments of the invention are directed toward any type of variable frequency drive system that receives power from an AC electrical port. As one example, the variable frequency drive system may receive AC power from an AC electrical machine operating in a regenerative mode in use with a traction drive system, with the variable frequency drive system conditioning such AC power for providing to an energy storage device coupled thereto for recharging the energy storage device. As another example, the variable frequency drive system may receive AC power from an AC generator, with the variable frequency drive system conditioning such AC power for providing to a DC load coupled thereto. Accordingly, embodiments of the invention are not meant to be restricted only to use in traction drive systems, but it is to be understood that embodiments of the invention encompass a variety of types of drive systems.

Figure 1:
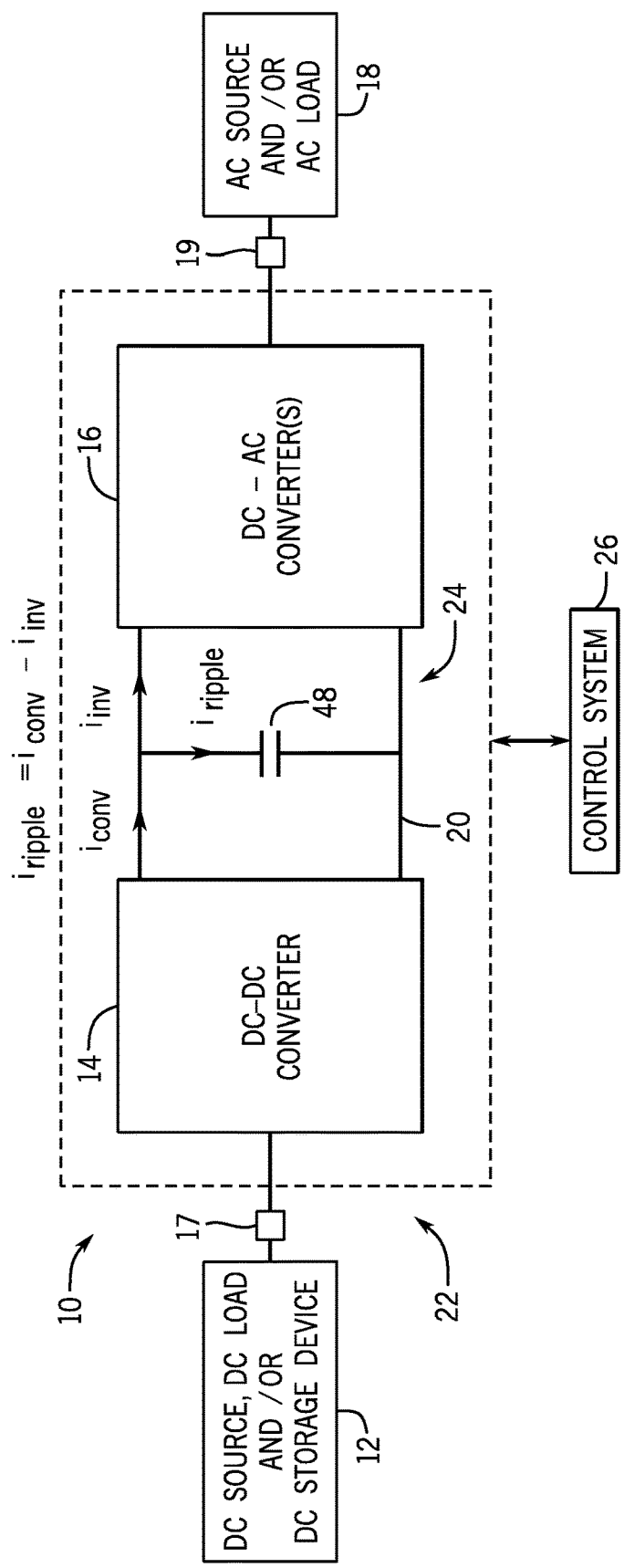
FIG. 1 is a schematic view of a drive system, according to an embodiment of the invention.

FIG. 1 illustrates a drive system 10 according to an embodiment of the invention. Drive system 10 generally includes one or more DC-DC converters 14 and one or more DC-AC converters 16. According to embodiments of the invention, the DC-DC converters 14 and DC-AC converters 16 may perform power conversion in only a single direction or may perform bi-directional power conversion (i.e., DC-DC converters 14 may perform bi-directional DC-DC conversion and DC-AC converters may perform DC-AC and AC-DC conversion). The DC-DC converters 14 and the DC-AC converters 16 condition power received from and provided to one or more DC electrical ports 17 and one or more AC electrical ports 19 electrically coupled to the drive system 10, with power transferred in the drive system and to the electrical ports 17, 19 via a DC link 20. One or more DC loads, DC power sources or DC energy storage devices, including and not limited to renewable power sources, batteries, and/or auxiliary loads and generally indicated at 12, may be coupled to the one or more DC electrical ports 17 to provide DC power thereto or receive DC power therefrom. One or more AC loads or AC power sources, including and not limited to AC electrical machines/motors and/or AC generators and generally indicated at 18, may be coupled to the one or more AC electrical ports 19 to receive AC power therefrom or provide AC power thereto. Operation of the DC-DC converter 14 and DC-AC converter 16 may be controlled by a control system 26 (comprised of one or more controllers) to provide power conversion and inversion as desired during operation of the drive system 10.

With respect to the DC electrical ports 17 and AC electrical ports 19 in system 10, it is to be understood that use of the term "port" in the present application is meant to refer simply to electrical connections provided to the system, such as between the DC-AC converter 16 and the AC electrical machines/motors and/or AC generators 18 and between the DC-DC converter 14 and the DC load, DC power source or DC energy storage device 12. Thus, the DC electrical ports 17 and AC electrical ports 19 are not meant to be limited to physical ports or receptacles, but are recognized as including all types of connections and wiring that provides electrical connections between components in the system 10.

Figure 2:
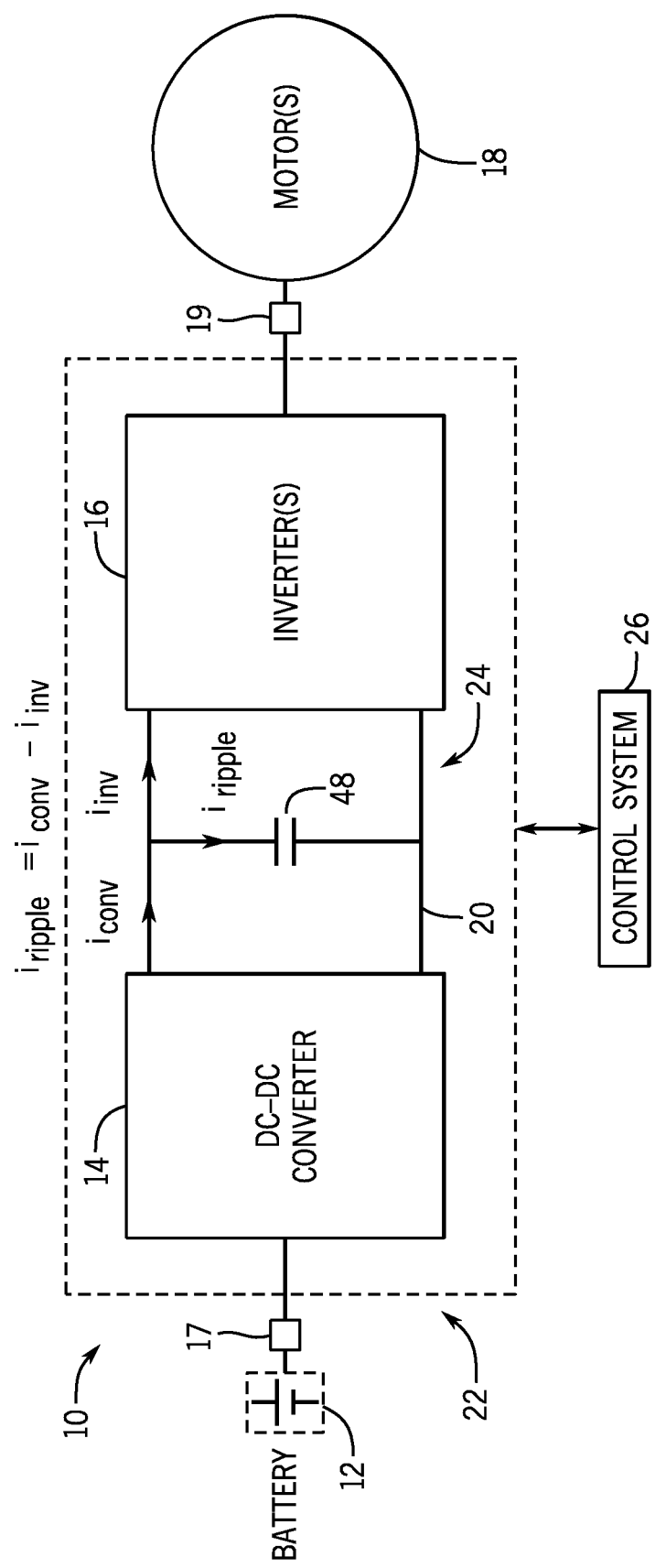
FIG. 2 is a schematic view of a traction drive system, such as for use in an electric vehicle, according to an embodiment of the invention.

Referring now to FIG. 2, a vehicle propulsion system 10 is illustrated according to one embodiment of the invention, with such an embodiment being used to further explain operation of a variable speed drive system that provides reduced DC link current ripple across a DC link capacitor in such a system. The vehicle propulsion system 10 may be used in electric or hybrid vehicle applications and generally includes one or more energy sources or energy storage devices 12 connected to corresponding DC electrical ports 17, one or more DC-DC converters 14, one or more DC-AC inverters 16, and one or more loads 18 connected to corresponding AC electrical ports 19 of the system 10. In the embodiment of FIG. 1, an energy storage device 12—in the form of a battery—provides a DC power in the propulsion system 10. It is recognized, however, that another type of energy storage device 12 such as an ultracapacitor, a fuel cell, a flywheel, or the like is also contemplated. Energy storage device 12 is coupled via a DC link 20 to DC-DC converter 14, DC-AC inverter 16, and load 18. The load 18 is preferably an AC motor, but is not limited as such. While not shown, it is to be understood that each of a plurality of motors 18 may be coupled to a respective wheel or other load or that each motor 18 may be coupled to a differential for distributing rotational power to the wheels or other load, and that additional DC-DC converters 14 and DC-AC inverters 16 may be included in propulsion system 10 for operation with such motors.

In operation of propulsion system 10 in an accelerating mode, the DC-DC converter 14 acts to boost the voltage provided by a low voltage side (generally indicated at 22) of the propulsion system 10 to a high voltage side (generally indicated at 24) of the propulsion system 10. That is, voltage provided via DC link 20 on the low voltage side 22 of propulsion system 10 is boosted by DC-DC converter 14 such that the voltage provided to DC link 20 on the high voltage side 24 of propulsion system 10 is increased, with the voltage being boosted to an operating level of motor 18. The boosted DC power output by DC-DC converter 14 is then provided to DC-AC inverter 16 via DC link 20 to drive motor 18. Operation of the DC-DC converter 14 and DC-AC inverter 16 may be controlled by a control system 26 (comprised of one or more controllers) to provide power conversion and inversion as desired for operation of the motor 18.

With regard to the DC-DC converter 14 and DC-AC inverter 16 shown in FIG. 1, it is recognized that the structure and operation of these components can vary according to embodiments of the invention. Accordingly, FIG. 2 illustrates an exemplary embodiment of the DC-AC inverter 16 and FIGS. 3-5 illustrate various embodiments of the DC-DC converter 14 that might be included in propulsion system 10 and whose operation may be controlled by control system 26.

Figure 3:
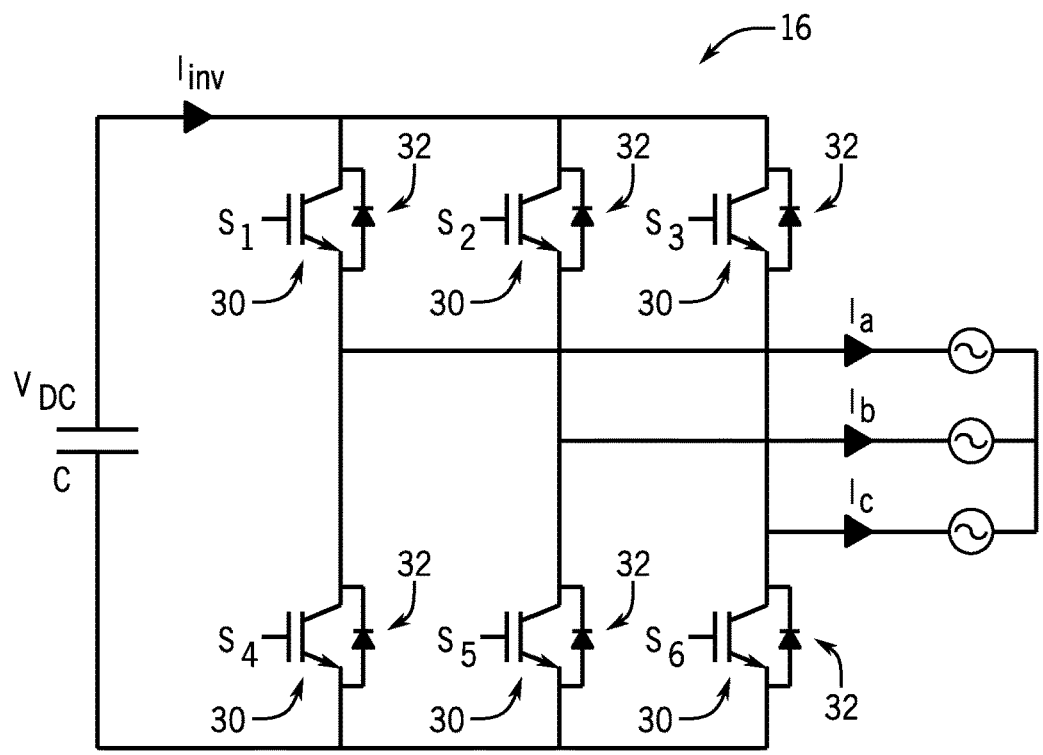
FIG. 3 is a schematic view of a DC-AC inverter for use in the traction drive system of FIG. 2.

Referring to FIG. 3, the DC-AC inverter 16 is operable as a variable speed drive (VSD) or variable frequency drive (VFD), as known in the art, and is comprised of a series of insulated gate bipolar transistor switches 30 (IGBTs) and anti-parallel diodes 32, such as an arrangement of six IGBTs 30 and diodes 32, that collectively synthesize AC voltage waveforms to a desired frequency and amplitude for delivery to a load, such as motor. While the DC-AC inverter is shown as including IGBTs 30 in combination with anti-parallel diodes 32, it is recognized that other embodiments of the invention contemplate other power switching devices as known in the art, such as MOSFETs with or without anti-parallel diodes 32, for example. Operation of the DC-AC inverter is via the control system 26, which performs high speed operations such as space-vector modulation, DC link voltage decoupling, and protection, for example. The control system 26 interfaces to the DC-AC inverter 16 via gate drive signals and sensing of the DC link voltage and pole currents such that changes in DC link voltage can be sensed. These voltage changes can be interpreted as transient load conditions and are used to control switching of the switches 30, such that near steady-state load conditions are maintained. For interfacing the control system 26 to the DC-AC inverter 16 via the gate drive signals, gate drivers (not shown) are installed on each phase power structure in the inverter. Each of the gate drivers receives low-power input signals from a signal generator in the control system 26 and produces an amplified high-current drive input for the gate of its corresponding IGBT 30, so as to facilitate efficient switching thereof. According to embodiments of the invention, control system 26 may operate DC-AC inverter according to a number of different control or modulation schemes that include carrier-based switching techniques, including sinusoidal pulse width modulation (PWM), space vector PWM and discontinuous PWM, as well as non-carrier-based switching techniques, such as for six-step inverters and selective harmonic elimination (SHE) inverter operation.

Figure 4:
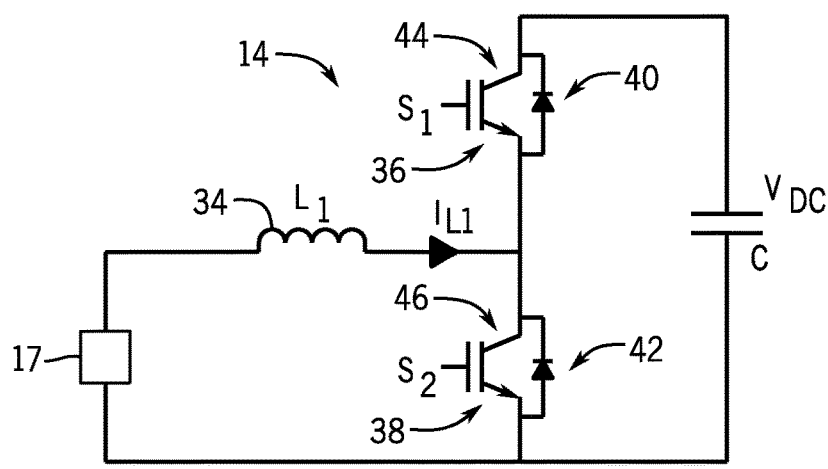
FIG. 4 is a schematic view of a single phase DC-DC converter for use in the traction drive system of FIG. 2.
Figure 5:
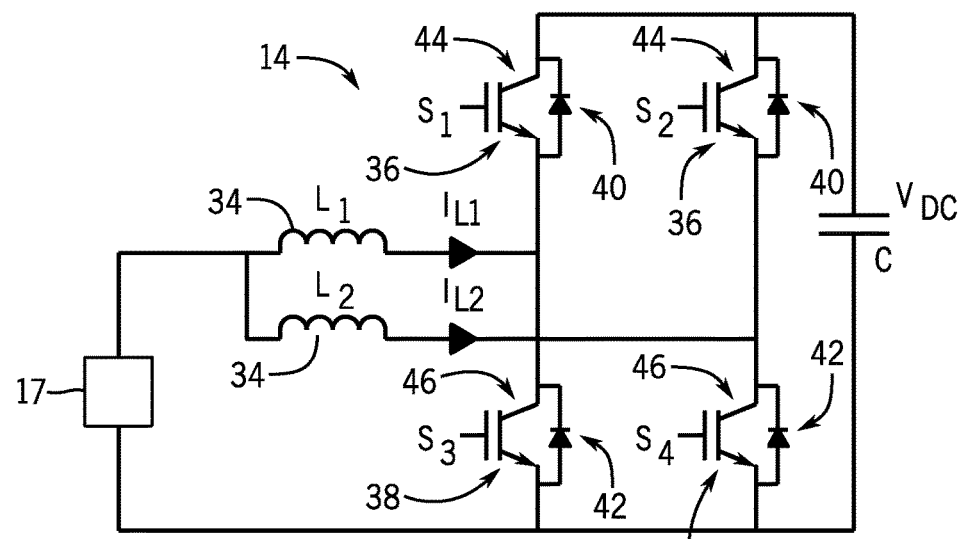
FIG. 5 is a schematic view of a dual phase interleaved DC-DC converter for use in the traction drive system of FIG. 2.
Figure 6:
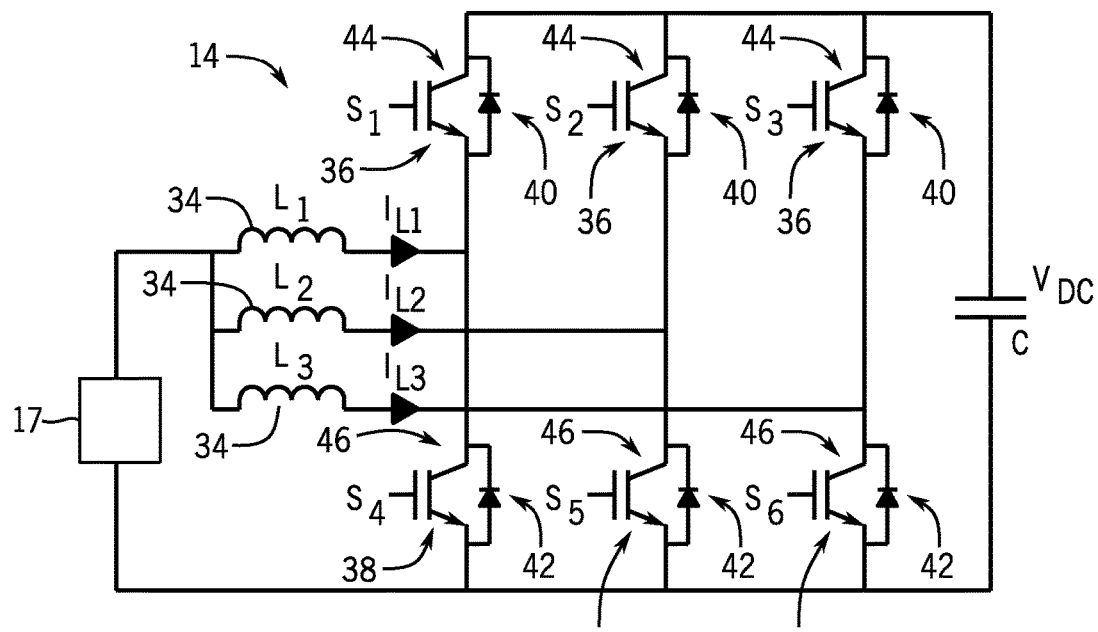
FIG. 6 is a schematic view of a three phase interleaved DC-DC converter for use in the traction drive system of FIG. 2.

Referring to FIGS. 4-6, various DC-DC converter constructions are illustrated. In FIG. 4, a single phase DC-DC converter 14 is illustrated that includes an inductor 34 coupled to a single phase leg that includes a pair of switches 36, 38 and a pair of diodes 40, 42. Each switch 36, 38 is coupled to a respective diode 40, 42, and each switch/diode pair forms a respective half phase module 44, 46. Switches 36, 38 are shown, for illustrative purposes, as insulated gate bipolar transistors (IGBTs). However, embodiments of the invention are not limited to IGBTs. Any appropriate electronic switch can be used, such as, for example, metal oxide semiconductor field effect transistors (MOSFETs), bipolar junction transistors (BJTs), and metal oxide semiconductor controlled thyristors (MCTs). The converter current is made up of pulses and has a fundamental frequency equal to the converter switching frequency ($f_{conv}$) of switches 36, 38.

In FIG. 5, a dual phase interleaved DC-DC converter 14 is illustrated that includes an inductor 34 coupled to each of a pair of phase legs that each include a pair of switches 36, 38 and a pair of diodes 40, 42. The inductors 34 in the two phase legs can be either uncoupled or coupled magnetically. The effective frequency of the converter current is twice the switching frequency of the converter switches 36, 38, such that the switching frequency of DC-DC converter 14 and DC-AC inverter 16 can be the same in order to get a DC current of a same frequency as the inverter dominant harmonic.

In FIG. 6, a three phase interleaved DC-DC converter 14 is illustrated that includes an inductor 34 coupled to each of three of phase legs that each include a pair of switches 36, 38 and a pair of diodes 40, 42. The inductors 34 in the three phase legs can be either uncoupled or coupled. The effective frequency of the converter current is three times the switching frequency of the converter switches 36, 38, such that the switching frequency of the DC-DC converter 14 is two-thirds the DC-AC inverter switching frequency to get a DC current of a same frequency as the inverter dominant harmonic.

Referring back now to FIG. 2 (and FIG. 1), it is shown that propulsion system further includes a DC link capacitor 48 that is coupled to DC link 20. The capacitor 48 acts to absorb current ripple on the DC link 20 created during the conversion from DC power to DC power and during the inversion from DC to AC power. The capacitor 48 is charged when no current is flowing into the DC-AC inverter 16, as current flows from energy storage device 12 into the capacitor 48, and the capacitor 48 is discharged as current flows from the capacitor 48 into the DC-AC inverter 16. In operation of the DC-AC inverter 16, e.g., PWM control of the inverter, the capacitor 48 alternates between charging and discharging during one cycle of operation, such that the capacitor current is pulsed. This pulsing of the capacitor current is referred to as current ripple, and it is recognized that current ripple may generate heat in the capacitor 48 and cause fluctuation of a voltage applied to the DC-AC inverter 16. The DC link capacitor 48 is typically sized for the ripple current it sees—with the life of the capacitor 48 depending on the current through it over time. In applications where the ambient temperature is high, reduction in capacitor ripple current is crucial.

According to embodiments of the invention, the control system 26 is programmed and configured to operate the DC-DC converter 14 and DC-AC inverter 16 in a manner that reduces the current ripple through the DC link capacitor 48. The control system 26 is operably connected to the DC-DC converter 14 and the DC-to-AC inverter 16 such that the control system 26 is able to receive operational and structural data on the DC-DC converter 14 and the DC-to-AC inverter 16—i.e., "operational parameters" of the DC-DC converter 14 and the DC-to-AC inverter 16—with the control system 26 then functioning to modify operation of the DC-DC converter 14 and/or the DC-to-AC inverter 16 based on these operational parameters. As will be explained in greater detail below, the operational parameters monitored by the control system 26 may be one or more of a modulation method of at least one DC-AC inverter 16, a number of phases of at least one DC-DC converter 14, a power factor of the AC electrical machine 18, a duty cycle of at least one DC-DC converter 14, a switching frequency of at least one DC-DC converter 14, a fundamental frequency of the AC electrical machine 18, and/or a modulation index of the DC-AC inverter 16, and the modifying of the operation of the DC-DC converter 14 and/or the DC-to-AC inverter 16 may comprise modifying one or more of a switching frequency of the DC-DC converter 14, a DC-DC converter carrier signal phase, an AC-DC inverter carrier signal phase, and/or a varying duty cycle pulse pattern of the DC-DC converter 14. Various embodiments of the invention are set forth here below regarding specific controlling of the DC-DC converter 14 and DC-AC inverter 16 by the control system 26.

Figure 7:
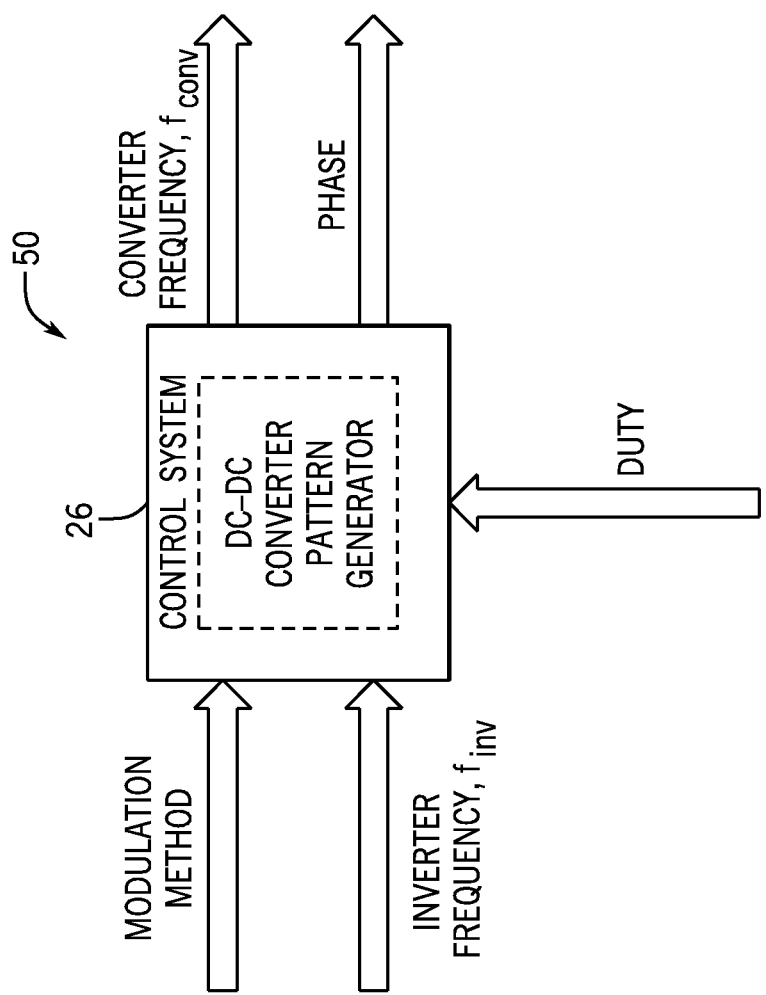
FIG. 7 is a block schematic diagram illustrating a control scheme for the traction drive system of FIG. 2, with a carrier based switching of the DC-AC inverter, for minimizing current ripple across the DC link capacitor therein, according to an embodiment of the invention.

Referring now to FIG. 7, and with continued reference to FIG. 2, a block schematic diagram illustrating a control scheme 50 for minimizing current ripple across the DC link capacitor 48 is provided for use when the DC-AC inverter 16 is operated according to a carrier-based control method, with the embodiment being described for a space vector pulse width modulation (SVPWM) scheme. As shown therein, operational parameters that are provided to the control system 26 are in the form of a modulation method of the DC-AC inverter 16, i.e., SVPWM, as well as an inverter switching frequency, $f_{inv}$, and a duty ratio of the DC-DC converter 14. Based on these operational parameter inputs, the control system 26 determines a DC-DC converter switching pattern that, in combination with operation of the DC-AC inverter 16, will serve to minimize the current ripple across the DC link capacitor 48. As shown in FIG. 7, the control of DC-DC converter 14 performed by control system 26 sets a DC-DC converter frequency, $f_{conv}$, and a phase of the carrier signal provided to the DC-DC converter 14.

As illustrated in Tables 1 and 2 below, the switching frequency of the DC-DC converter 14 and the carrier signal phase shift implemented will depend on the number of phases of the DC-DC converter 14, and the phase shift implemented will also depend on the duty ratio of the DC-DC converter 15, with a phase shift being implemented between the converter and inverter carrier at a preset value of duty ratio, such that ripple reduction is obtained through current cancellation. The duty ratio is defined as:

$$d = 1 - \text{Source voltage/Output voltage}.$$

The relation between switching frequencies to get the lowest current ripple is:

$$\text{Inverter switching frequency} = f_{inv}$$

$$\text{Inverter current frequency} = 2f_{inv}.$$

The switching frequency and converter current frequency are thus shown in Table 1 as:

TABLE 1

| Number of Converter Phases | Switching Frequency of Converter | Converter Current Frequency |
|---|---|---|
| 1 | $2f_{inv}$ | $2f_{inv}$ |
| 2 | $f_{inv}$ | $2f_{inv}$ |
| 3 | $(2/3)f_{inv}$ | $2f_{inv}$ |
| m | $(2/m)f_{inv}$ | $2f_{inv}$ |

The phase shift between inverter and converter carrier and transition duty ratio for different DC-DC converter topologies is set forth in Table 2 as:

TABLE 2

| Number of Converter Phases | Shift (degrees) | Transition Duty Ratio |
|---|---|---|
| 2 | 90 | 1/2 |
| 3 | 60 | 1/3, 2/3 |
| m | 360/(2m) | 1/m, 2/m, 3/m, ... |

Figure 8:
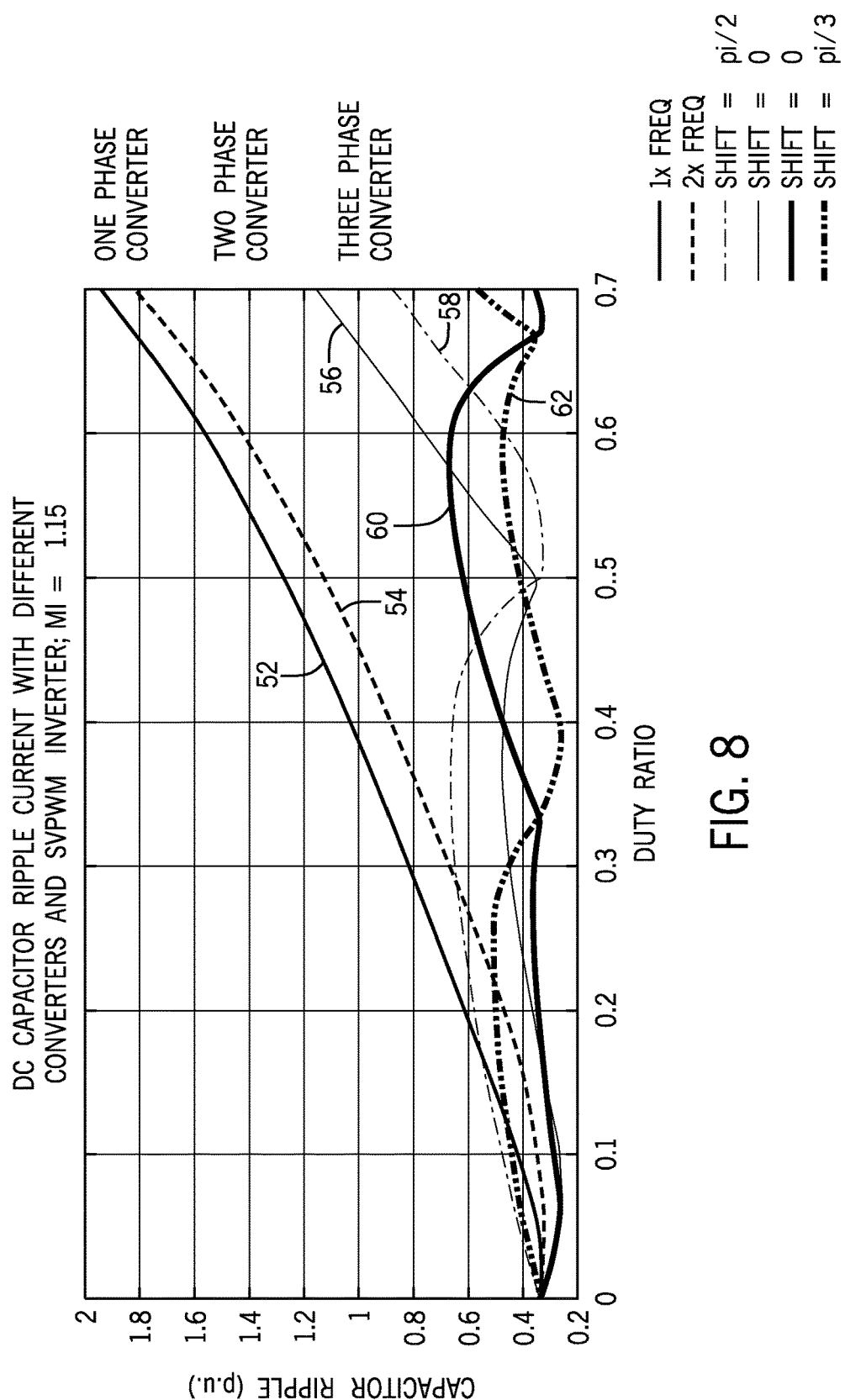
FIG. 8 is a graph illustrating DC capacitor ripple current for a SVPWM operated DC-AC inverter with single, dual, and three phase DC-DC converters, with and without implementation of different converter switching frequencies and carrier signal phase shifts.

Referring now to FIG. 8, a graph is provided illustrating DC capacitor ripple current for a SVPWM operated DC-AC inverter with single, dual and three phase DC-DC converters, with and without implementation of different converter switching frequencies and carrier signal phase shifts.

For a DC-DC converter 14 with a single phase leg, if the switching frequency of the converter is made twice that of inverter, pulses at the same frequency are obtained and some ripple reduction is achieved, as indicated by comparing lines 52, 54.

For a dual phase interleaved DC-DC converter 14, the effective frequency of converter current is now twice the switching frequency of the converter and the switching frequency of the converter and inverter can thus be the same, with a phase difference between the two converter legs being $\pi$ radians. When the duty ratio of the DC-DC converter 14 is between zero and 0.5, the ripple from the converter is low, with one of the converter phase carrier and inverter carrier being in phase and having the same frequency. When the duty ratio of the DC-DC converter 14 is higher than 0.5, the zero states of the converter and inverter current do not overlap. To counter this, if a phase shift of $\pi/2$ radians is introduced between the inverter carrier and the converter carrier, the ripple current is reduced significantly, as indicated by comparing lines 56, 58.

For a three phase interleaved DC-DC converter 14, the effective frequency of converter current is now three times the converter switching frequency, with the phase difference between the three converter legs being $2\pi/3$ radians. The switching frequency to be used for the converter is $\frac{2}{3}$ times the inverter switching frequency to get a DC current of the same frequency as the inverter. When the duty ratio of the DC-DC converter 14 is between $\frac{1}{3}$ and $\frac{2}{3}$, the ripple current is at a high level such that implementation of a phase shift of $\pi/3$ radians between the inverter and converter carrier is desirable to reduce the ripple current, as indicated by comparing lines 60, 62. However, for duty ratios less than $\frac{1}{3}$ and greater than $\frac{2}{3}$, ripple current is such that no phase shift is desirable, as implementation of a phase shift would increase ripple current, as again indicated by comparing lines 60, 62

With respect to implementation of a phase shift between the inverter and converter carriers, it is recognized that such a shift may be implemented in numerous ways—i.e., by phase shifting the DC-DC converter carrier, phase shifting the DC-AC inverter carrier, or introducing a different frequency carrier until the desired phase shift is achieved and then resuming the regular switching frequency carrier for either the converter or inverter.

Figure 9:
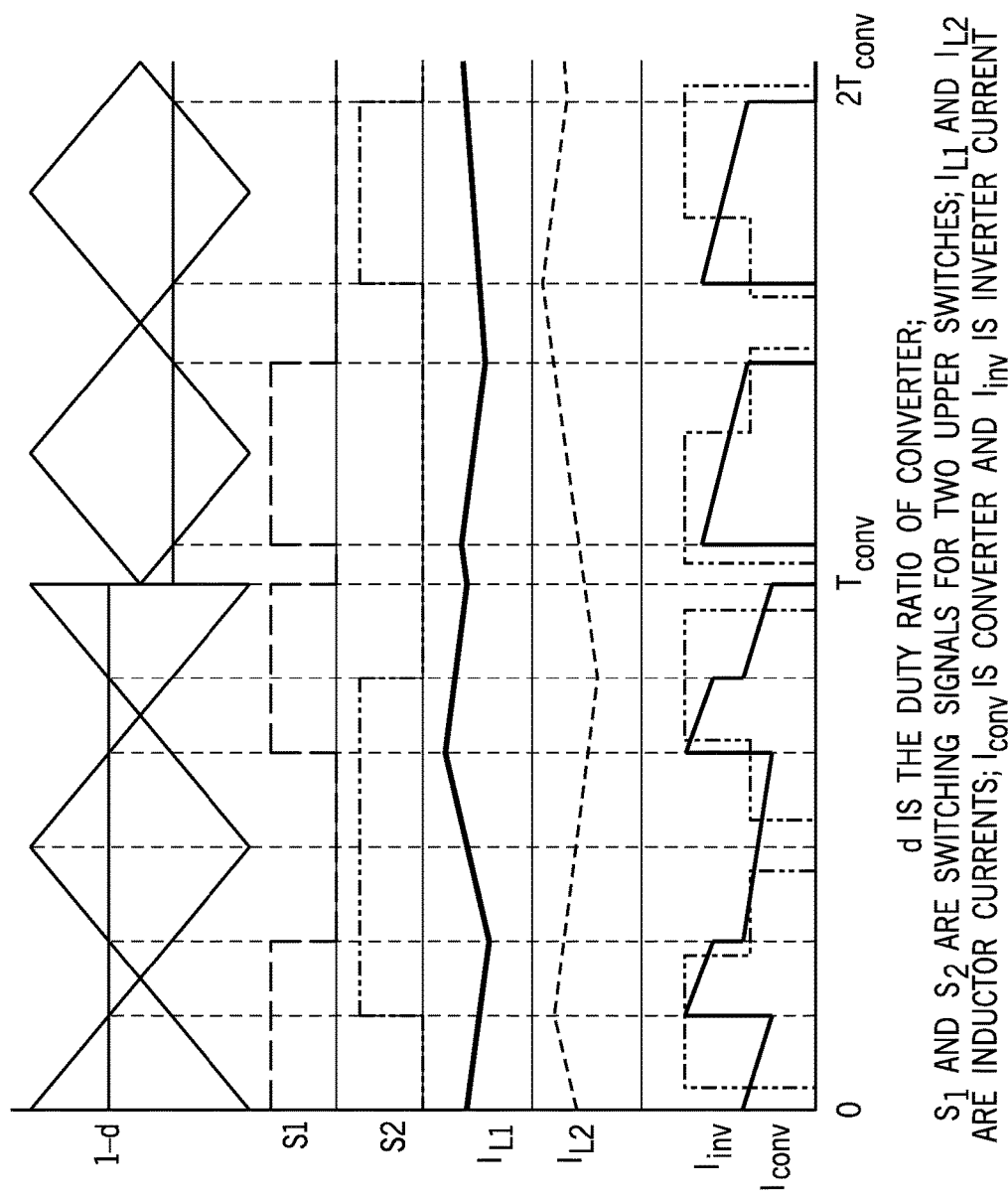
FIG. 9 is a graph illustrating phase shifting of a DC-DC converter carrier at a pre-determined duty ratio of the DC-DC converter, with the DC-DC converter carrier being phase-shifted with respect to the inverter carrier, according to an embodiment of the invention.

FIG. 9 illustrates phase shifting of the DC-DC converter carrier at a pre-determined duty ratio of the DC-DC converter, with the DC-DC converter carrier being phase-shifted with respect to the inverter carrier. The shifted carrier is applied only in a defined duty ratio range and the phase shift is otherwise removed to revert to the original carrier. The shift in the carrier can either be implemented in one step or the shift can be added over multiple carrier cycles. As can be seen in FIG. 9, implementation of the phase shift results in $I_{inv}$ and $I_{conv}$ being aligned, so as to reduce current ripple across the DC link capacitor.

Figure 10:
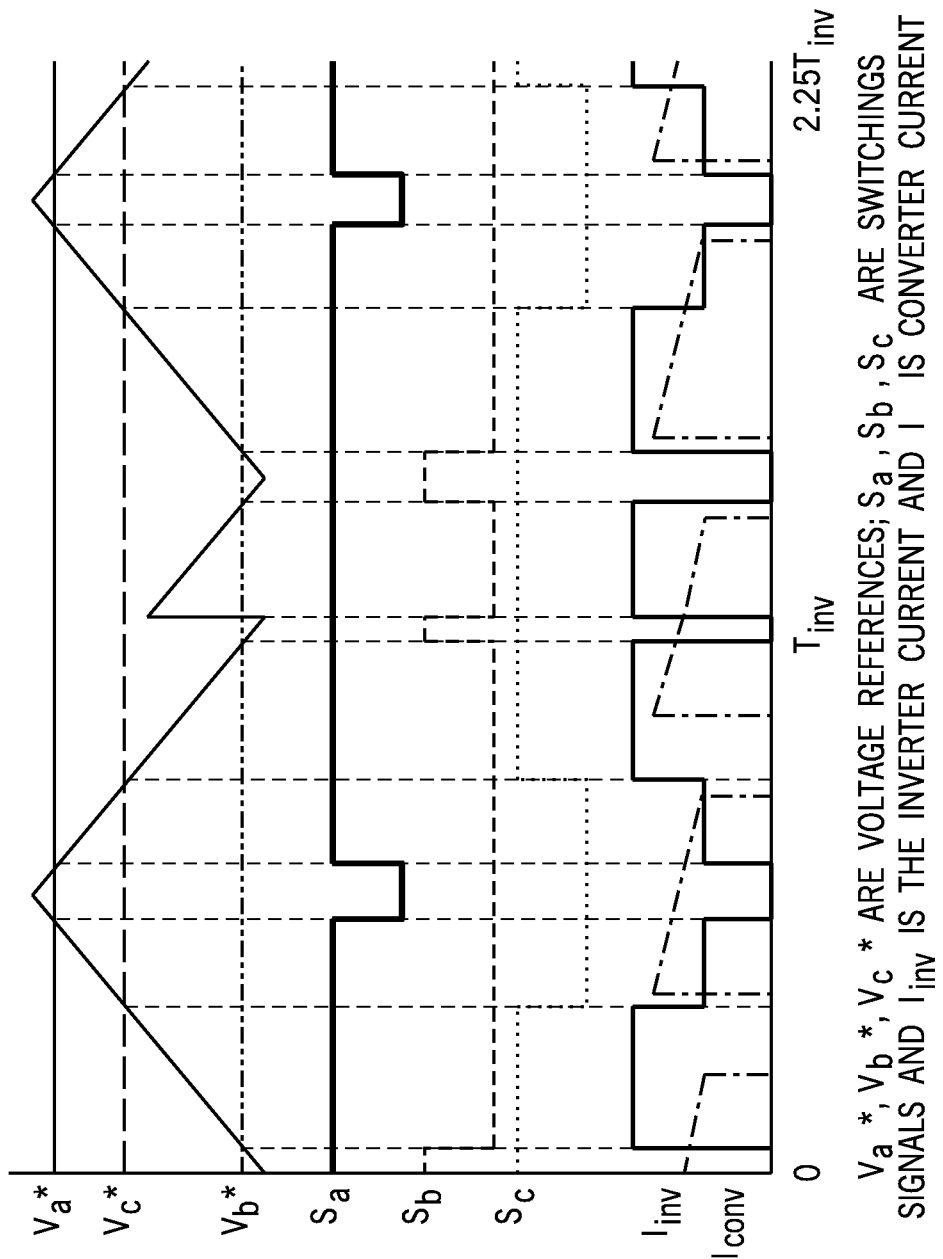
FIG. 10 is a graph illustrating phase shifting of a DC-AC inverter carrier at a pre-determined duty ratio of the DC-DC converter, with the DC-AC inverter carrier being phase-shifted with respect to the converter carrier, according to an embodiment of the invention.
Figure 11:
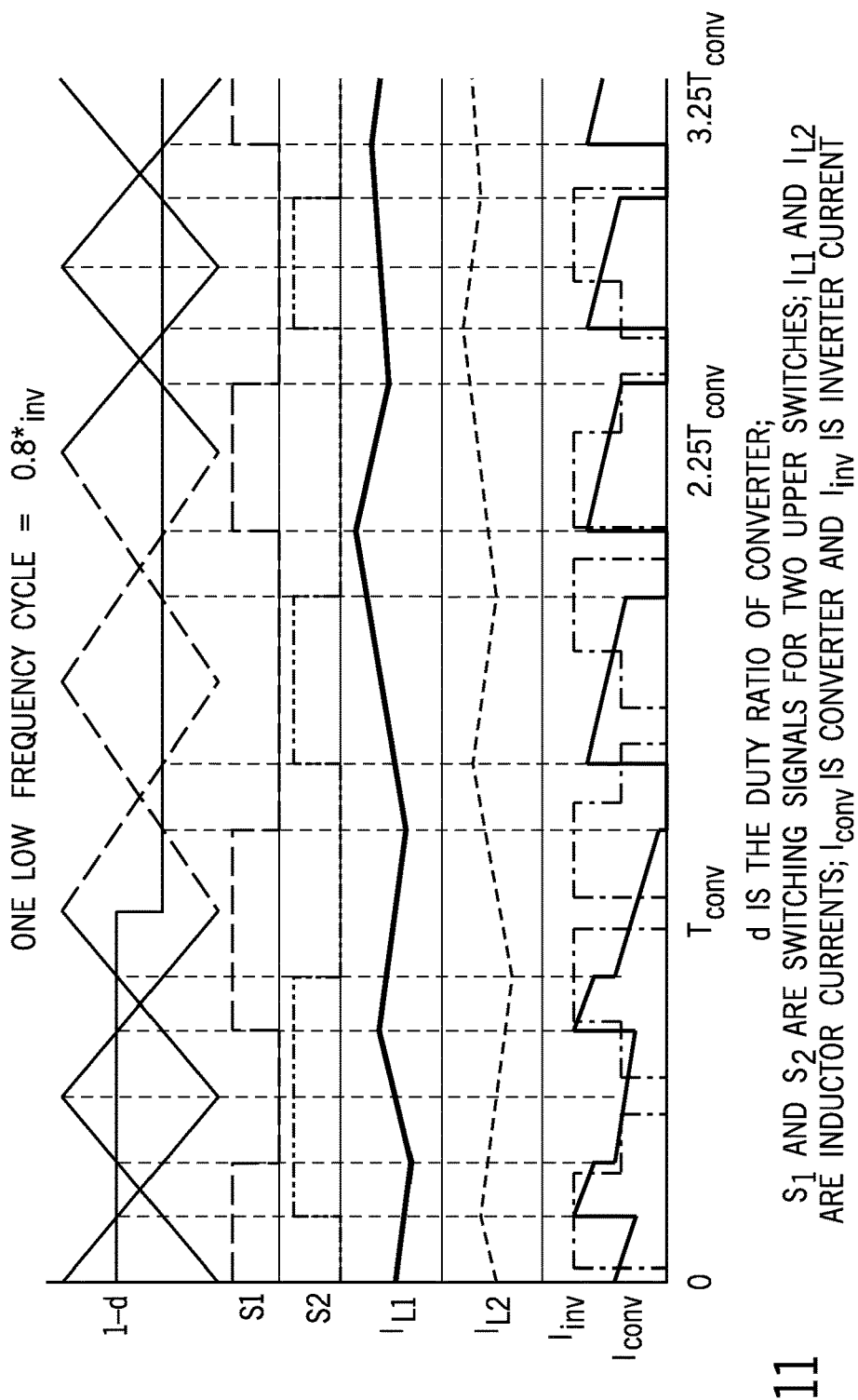
FIG. 11 is a graph illustrating implementation of a phase shift between the inverter and converter carriers via introduction of a different frequency carrier cycle, according to an embodiment of the invention.

FIG. 10 illustrates phase shifting of the DC-AC inverter carrier, with the inverter carrier being phase-shifted with respect to the converter carrier. The shifted carrier is applied only in a defined duty ratio range and the phase shift is otherwise removed to revert to the original carrier. The shift in the carrier can either be implemented in one step or the shift can be added over multiple carrier cycles, and the switching pattern for modulation can also be changed to align current pulses to get ripple cancellation. As can be seen in FIG. 10, implementation of the phase shift results in $I_{inv}$ and $I_{conv}$ being aligned to introduce ripple cancellation, and thereby reduce current ripple across the DC link capacitor FIG. 11 illustrates implementation of a phase shift between the inverter and converter carriers via introduction of a different frequency carrier. That is, in this technique, there is no change in the converter carrier signal frequency with duty ratio, but a low frequency carrier cycle can be introduced in between to introduce a phase shift. Introduction of the low frequency carrier can continue until the desired phase shift is achieved, at which time the regular carrier frequency resumes. When the duty ratio transitions a critical point again, a high frequency carrier cycle is introduced to remove the phase shift with respect to the inverter carrier. Application of the low or high frequency carrier cycle and the resulting phase shift can be implemented in any number of modified carrier frequency cycles. The phase shift can also be implemented by introducing a high frequency carrier cycle in the inverter carrier until the desired phase shift is achieved, at which time the regular carrier frequency resumes. To remove the phase shift, a low frequency carrier in the inverter carrier or a high frequency carrier in the converter can be introduced. It may be beneficial to use high frequency carrier to avoid inductor saturation.

From FIGS. 7-11, it is thus seen that, for carrier based inverter PWM methods such as SVPWM, the DC-DC converter carrier is phase-locked with the inverter carrier, with a relation depending on the duty ratio and number of converter phases. The technique(s) implemented by control system 26 for altering the switching frequency in the DC-DC converter and introducing phase shifts between the DC-DC converter and DC-AC inverter carrier signals works in the over-modulation region as well where pulse dropping occurs.

According to additional embodiments, DC link current ripple reduction may also be implemented in other modulation strategies, with some modifications being made with regard to controlling of the DC-DC converter 14 and DC-AC inverter 16. For example, a discontinuous PWM method may be used for operation of DC-AC inverter 16. In a generalized discontinuous PWM control scheme, a modulator phase angle, $\psi_m$, is defined which generates different third harmonic waveforms and can be used to reduce switching losses based on power factor. The angle $\psi_m$ is used to define the section of the reference voltage that is clamped to the DC rail. For the discontinuous PWM control scheme, the DC-AC inverter current pattern alternates every 60° interval of fundamental motor current cycle. Six 60° sectors from 1 to 6 can be defined by using the difference of voltage angle, $\theta$, and modulator phase angle, $\psi_m$. Unlike the SVPWM case, the inverter current in the discontinuous PWM control scheme is at the inverter switching frequency (i.e., inverter current frequency and inverter switching frequency=$f_{inv}$).

As illustrated in Tables 3 and 4 below, the switching frequency of the DC-DC converter 14 will depend on the number of phases of the DC-DC converter 14 and the phase shift implemented will depend on the number of phases of the DC-DC converter 14, the operating sector of the AC electrical machine 18, and the duty ratio of the DC-DC converter 14, with a phase shift being implemented between the converter and inverter carriers at a preset value of duty ratio and in specific sectors, such that ripple reduction is obtained through current cancellation.

As shown in Table 3, the relation between switching frequencies to get the lowest current ripple is:

TABLE 3

| Number of Converter Phases | Switching Frequency of Converter | Converter Current Frequency |
| --- | --- | --- |
| 1 | $f_{inv}$ | $f_{inv}$ |
| 2 | $(1/2)f_{inv}$ | $f_{inv}$ |
| 3 | $(1/3)f_{inv}$ | $f_{inv}$ |
| m | $(1/m)f_{inv}$ | $f_{inv}$ |

The phase shift between inverter and converter carrier with regard to the transition duty ratio for different converter topologies and in different operating sectors is set forth in Table 4 as:

TABLE 4

| Number of Converter Phases | Even Sector Shift (degrees) | Odd Sector Shift (degrees) | Transition Duty Ratio |
| --- | --- | --- | --- |
| 1 | 0 | 180 | — |
| 2 | 0, 90 | 90, 0 | 1/2 |
| 3 | 0, 60, 0 | 60, 0, 60 | 1/3, 2/3 |
| m | 0, 360/(2m), 0, 360/(2m), . . . | 360/(2m), 0, 360/(2m), 0, . . . | 1/m, 2/m, 3/m, . . . |

As can be seen in Table 4, for a DC-DC boost converter 14 with a single phase leg, the carrier signal shift between the converter and inverter carrier signals is dependent only on the operating sector of the AC electrical machine 18, with the carrier signal shift being π for odd numbered sectors and being 0 for even numbered sectors. For a dual phase interleaved DC-DC converter 14, the carrier signal shift between the converter and inverter carrier signals is dependent on the operating sector and the duty ratio, with carrier signal shift being π/2 for odd numbered sectors and 0 for even numbered sectors when a duty ratio is less than 0.5, and being π/2 for even numbered sectors and 0 for odd numbered sectors when a duty ratio is greater than 0.5.

Figure 12:
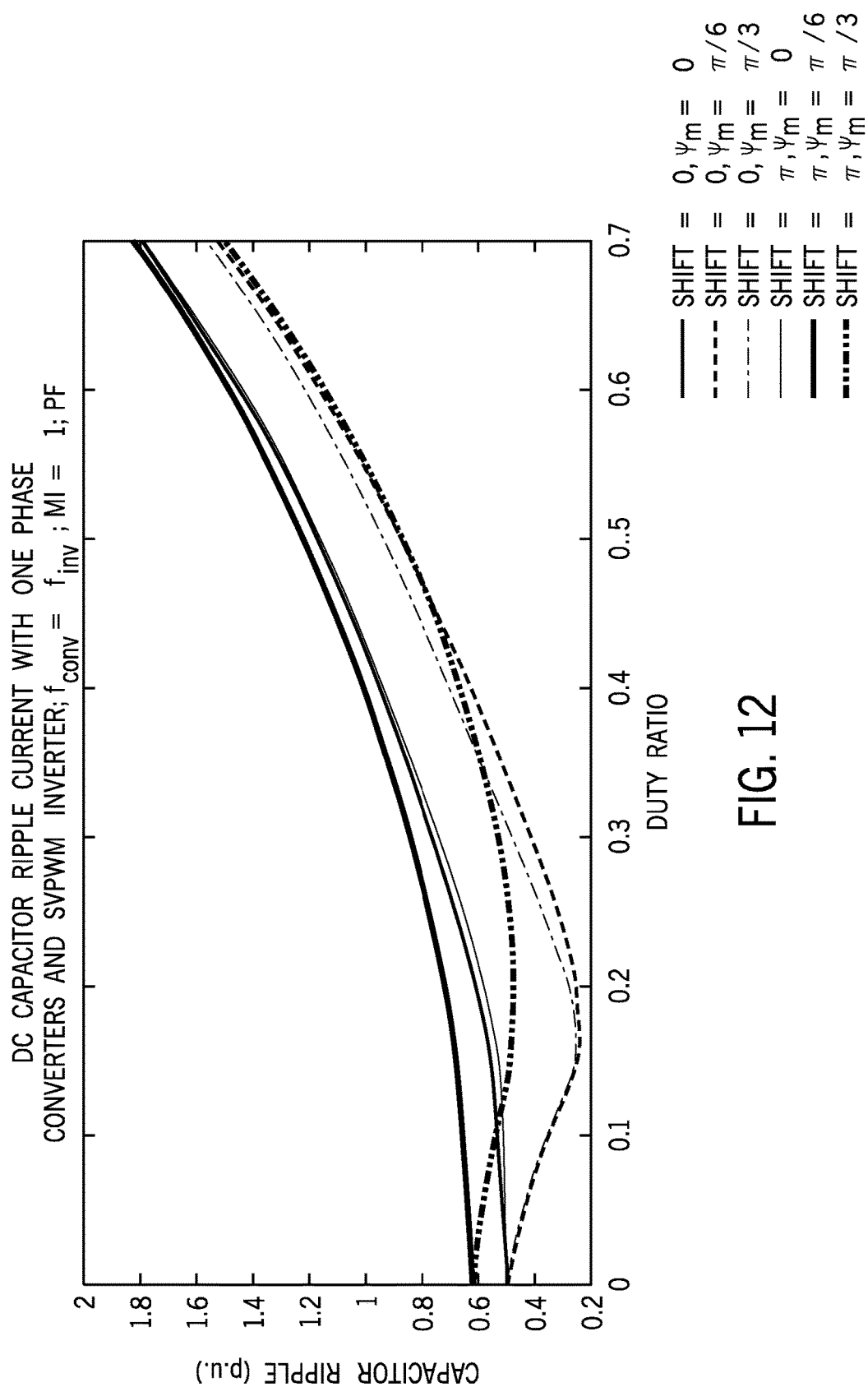
FIGS. 12 and 13 are graphs illustrating DC capacitor ripple currents for a discontinuous PWM operated DC-AC inverter with single and dual phase DC-DC converters, with and without implementation of carrier signal phase shifts, according to an embodiment of the invention.
Figure 13:
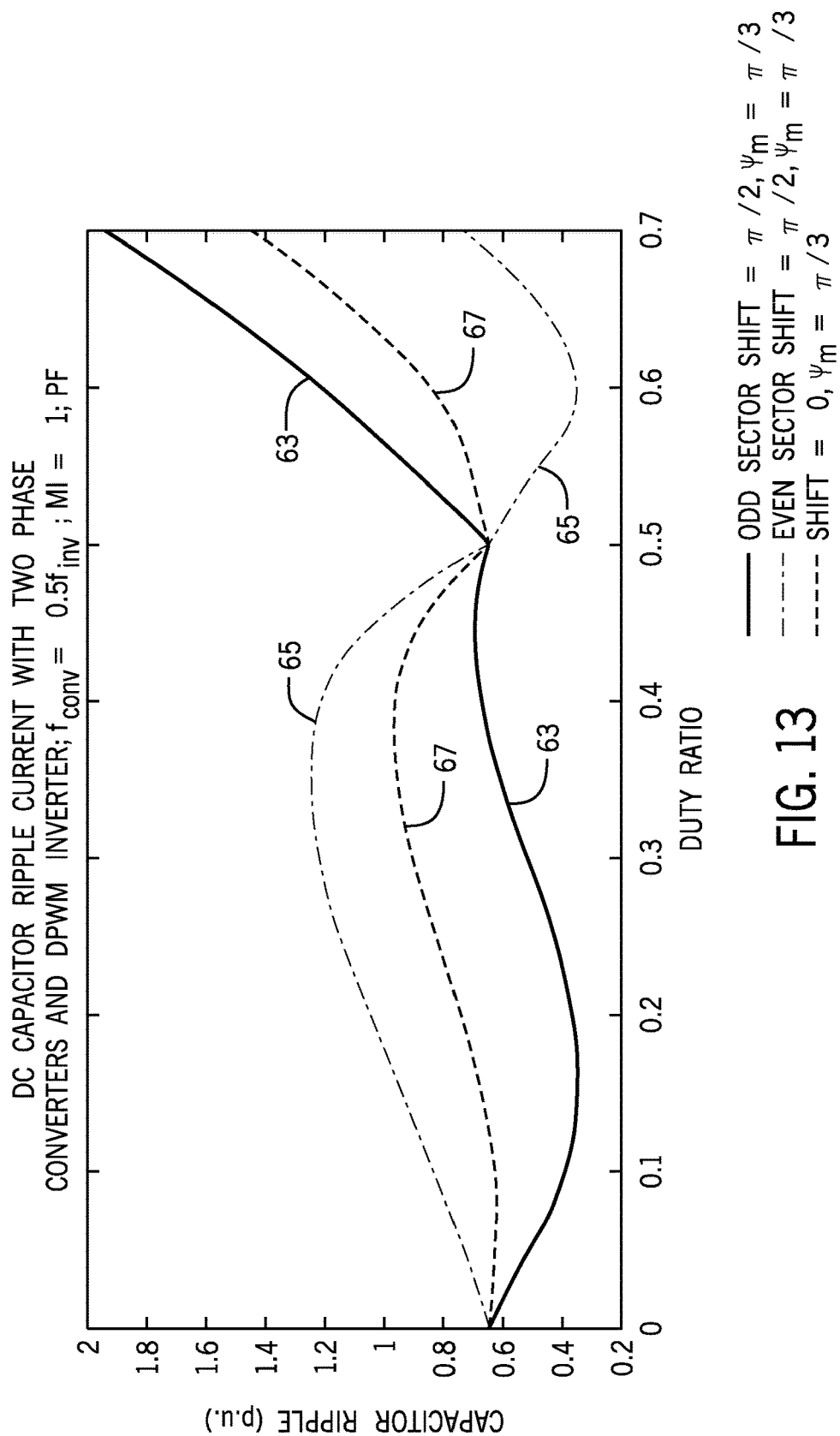

Referring now to FIGS. 12 and 13, graphs are provided illustrating DC capacitor ripple currents for a discontinuous PWM operated DC-AC inverter 16 with single and dual phase DC-DC converters 14, with and without implementation of carrier signal phase shifts. In FIG. 12, current ripple across the DC link capacitor 48 is illustrated for a fundamental motor current cycle with and without carrier signal phase shifts according to the sector of operation. The solid lines indicate the ripple current when no scheme to mitigate the ripple current is implemented. The dashed lines indicate the reduced ripple current obtained when phase shift as per Table 4 is implemented. In FIG. 13, current ripple across the DC link capacitor is illustrated for a fundamental cycle where the modulator phase angle, $\psi_m$, is π/3, for an odd sector carrier signal phase shift 63, an even sector carrier signal phase shift 65, and a zero carrier signal phase shift 67. It indicates that, to get reduced current ripple, the carrier signal phase shift varies with the sector and the duty ratio.

According to additional embodiments, DC link current ripple reduction may also be implemented for a six step inverter operable with different conduction intervals. In a six step inverter with a 180° conduction interval, each switch conducts for 180°. With the six step inverter, the inverter current is at six (6) times the fundamental motor frequency. Therefore, in order to provide some level of ripple current reduction, the control system 26 may operate the DC-DC converter 14 such that the converter current frequency is at six times the fundamental frequency, $6f_{fund}$, or an integer multiple, n, of $6f_{fund}$. Further reduction in ripple current can be obtained by aligning the DC-DC converter current pulse with the phase transition of DC-AC inverter current, or with the maximum current amplitude. If a shift dependent on duty ratio, d, is implemented in the converter carrier signal, a substantial ripple reduction is achieved as the pulses get aligned with phase transitions instead of being centered. This reduces the number of transitions in the DC link current and also the RMS of the ripple current for low power factors. Based on the power factor, the shift should either be lagging or leading. For lagging power factor, the converter carrier is desired to lag by dπ and for leading power factor, converter carrier is desired to lead by dπ. If continuously changing the shift based on duty is not feasible, a fixed shift can be implemented which would still provide ripple reduction. For power factor close to 1, the maximum amplitude occurs around the center of a 60° sector, so shifting the converter current may not add much value. However, with lower power factors, the benefit of a phase shift implementation can be seen.

In a six step inverter with a 1200 conduction interval, each switch conducts for 120° and is OFF for the remaining time. The firing angle, φ, for each switch is the instant where the turn-on occurs, and this governs the shape of the current waveform. Most ripple cancellation can be achieved by shifting the converter carrier by dπ+6nφ with respect to motor phase voltage. If power factor is lagging, the converter phase is shifted by −(dπ+6nφ) and if power factor is leading, converter phase is shifted by dπ+6nφ.

Figure 14:
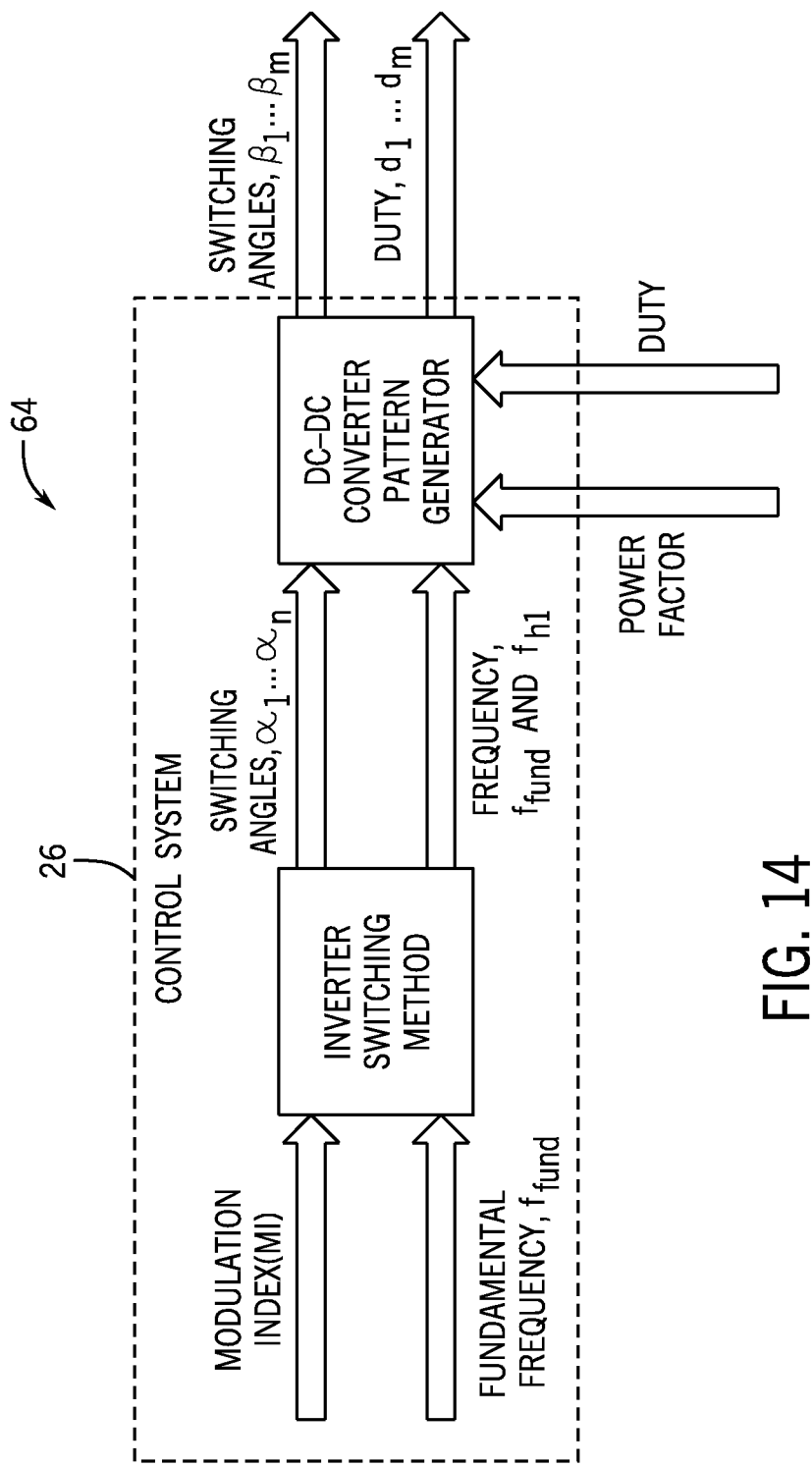
FIG. 14 is a block schematic diagram illustrating a control scheme for the traction drive system of FIG. 2, with a non-carrier based switching of the DC-AC inverter, for minimizing current ripple across the DC link capacitor therein, according to an embodiment of the invention.

According to still additional embodiments, DC link current ripple reduction may also be implemented for a wide variety of non-carrier based switching methods, including implementation with six-step inverters and selective harmonic elimination (SHE) inverters. Referring now to FIG. 14, and with continued reference to FIG. 2, a block schematic diagram is provided illustrating a control scheme 64 for minimizing current ripple across the DC link capacitor 48 for use when the DC-AC inverter 16 is operated according to a non-carrier based switching method, with the method being implementable with single phase or multiphase DC-DC converters 14. As shown therein, operational parameters that are provided to the control system 26 are in the form of a modulation index of the DC-AC inverter 16 as well as a fundamental frequency, $f_{fund}$, from which switching angles, $\alpha_n$, and a first harmonic, $f_{h1}$, for the DC-AC inverter 16 can be determined. Operational parameters that are provided to the control system 26 further include a power factor of the AC electrical machine 18 and a duty ratio of the DC-DC converter 14. Based on these operational parameter inputs, the control system 26 determines a DC-DC converter switching pattern that, in combination with operation of the DC-AC inverter 16, will serve to minimize the current ripple across the DC link capacitor 48. As shown in FIG. 14, the control of DC-DC converter 14 performed by control system 26 sets switching angles $\beta_1 \ldots \beta_m$ for the DC-DC converter switches 36, 38 (FIGS. 4-6), as well as a duty ratio, $d_1 \ldots d_m$ for each of a number of switching cycles, with the number of converter switching cycles in 60° being $m=f_{conv}/6f_{fund}$.

In the case of six-step or pre-programmed PWM methods, the switching angles are known based on the modulation index. Based on the power factor and duty ratio of the DC-DC converter 14, an optimal converter current waveform can be developed to minimize the DC link ripple current. In a three phase balanced system, the waveform in ⅙th of the fundamental cycle repeats due to the nature of the system. Hence, in a 60° period, minimization can be done by varying the switching frequency and the duty ratio of the DC-DC converter 14 while maintaining the average duty ratio in that period.

Depending on the switching method, the first significant harmonic, $f_{h1}$, in the inverter current may vary. The converter frequency, $f_{conv}$ should be made equal to $f_{h1}$ or an integer multiple of $f_{h1}$, depending on feasibility. For the converter current, assume the switching angles are denoted by $\beta_1, \beta_2 \ldots \beta_m$, with d being the average duty ratio in the sector considered. Each switching cycle could have a different duty ratio $d_1, d_2 \ldots d_m$ such that their average is d. Now, based on the modulation index (inverter switching angles), power factor, and switching frequency of the DC-DC converter 14 (represented through m), it is possible to determine $\beta_1, \beta_2 \ldots \beta_m$ and $d_1, d_2 \ldots d_m$ that will minimize the ripple current. According to one embodiment, these values can be programmed in a look-up table.

As an example of the control scheme described above and illustrated in FIG. 14, a six-step inverter waveform for power factor 0.8 in a 60° interval is described here below. The waveform is periodic every 60°. Assuming m=3, we find $\beta_1, \beta_2, \beta_3$ and $d_1, d_2, d_3$ such that ripple current RMS is minimized subject to:

Minimum duty$\leq d_1, d_2, d_3 \leq$Maximum duty $d_3 = 3d - d_1 - d_2$ $\beta_1 < \beta_2 < \beta_3$ $T_1 + T_2 + T_3 = T_{fund}/6$ Here, $d_1$, $d_2$, and $d_3$ could vary between 0 and 0.62. Additional limits can be imposed on $\beta$ if required to maintain a frequency range. If m can vary with power factor or duty, another degree of freedom is added.

Figure 15:
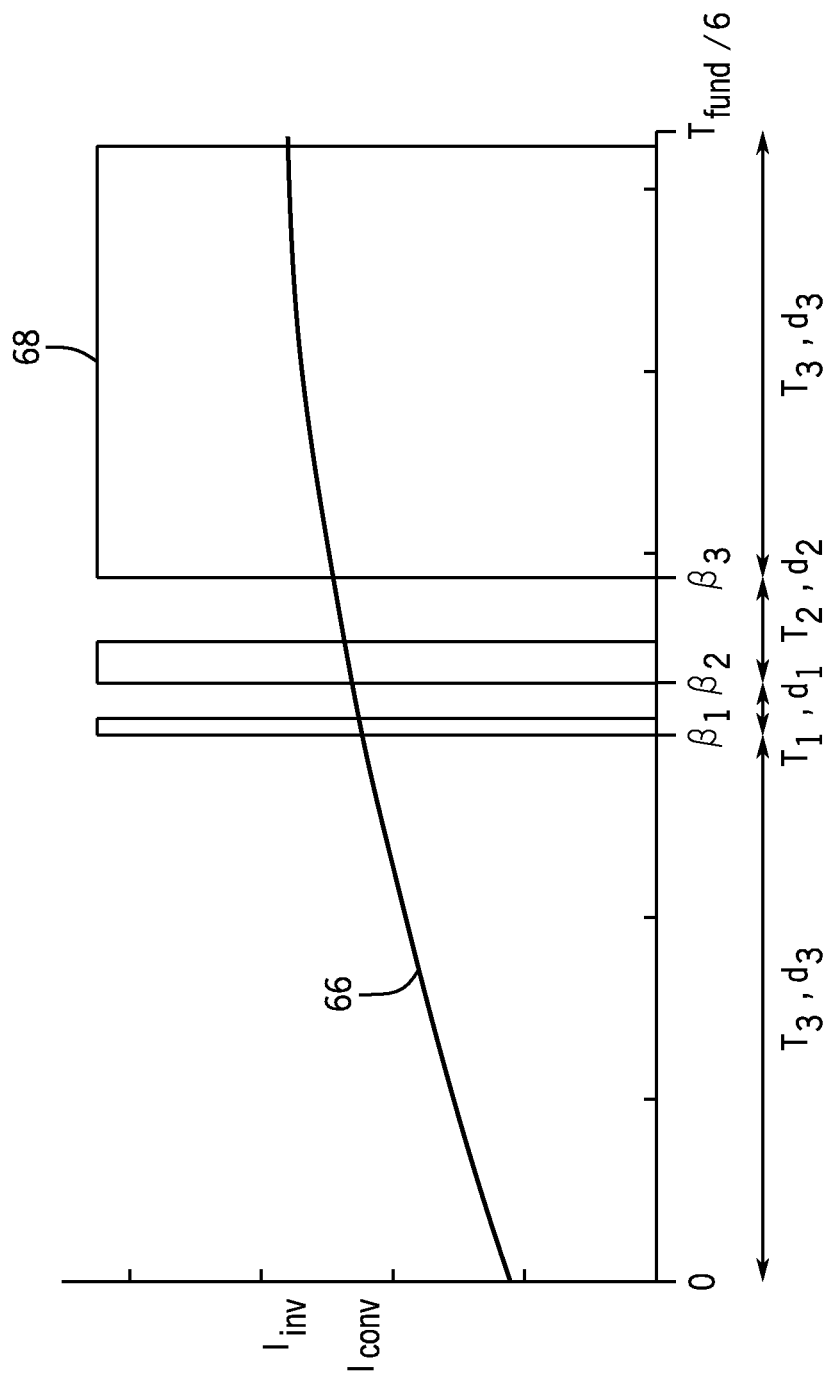
FIG. 15 is a graph illustrating six step DC-AC inverter and DC-DC converter waveforms for a non-carrier based switching method of a six-step inverter, according to an embodiment of the invention.

FIG. 15 shows the six step DC-AC inverter and DC-DC converter waveforms, indicated as 66 and 68, respectively. Using such a control scheme, current ripple is lessened as compared to if the control scheme were not implemented.

In the case of selective harmonic elimination methods where certain harmonics are reduced from the current waveform, it is recognized that, if N is the number of switching angles in 90°, N-1 lower order harmonics are eliminated. The first significant harmonic in inverter current is given by:

$f_{h1} = 3N+3$ for odd $N$ $f_{h1} = 3N$ for even $N$

The converter current frequency should be equal to the first significant harmonic frequency in the inverter current. The inverter current waveform repeats every 60°, so considering one 60° interval, the number of converter current cycles in it is:

$N_c = f_{h1}/6$

If $N_c$ is outside of the range of acceptable converter frequencies, an integer multiple of $N_c$ should be used, m. This implies that there will be m switching events in the 60° fundamental period considered.

The chopping angles of a single phase are given by $\alpha_1, \alpha_2, \ldots \alpha_N$. The chopping angles of other phases can be obtained by adding 120° and 240° to phase A angles. The inverter current would have phase transitions or zero states due to the cumulative effect of all chopping angles. An optimal waveform (like that in the six-step implementation) can be obtained for SHE operation by determining $\beta_1, \beta_2 \ldots \beta_m$ and $d_1, d_2 \ldots d_m$, which will minimize the ripple current.

As an example of SHE operation, consider a SHE waveform with:

$N=2$

Figure 16:
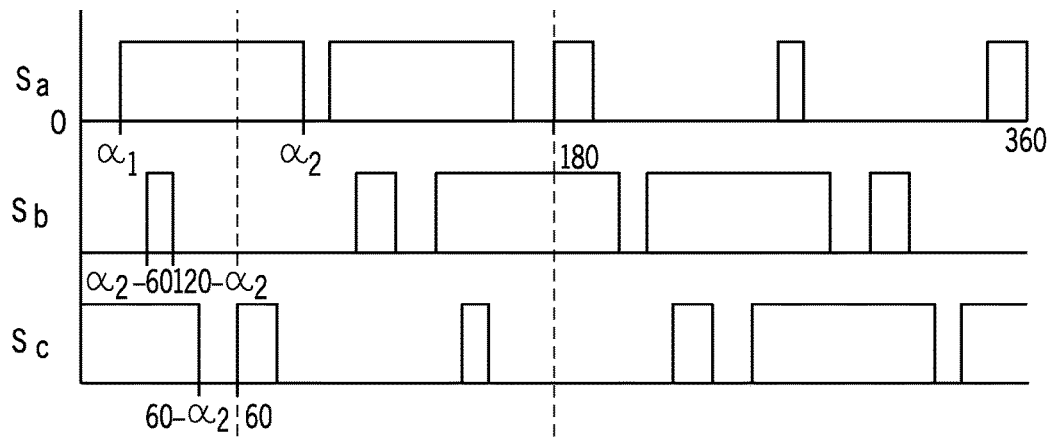
FIGS. 16 and 17 are graphs illustrating a selective harmonic elimination (SHE) inverter switching pattern and corresponding inverter and current waveforms for a 60° period resulting from such a switching pattern, according to an embodiment of the invention.
Figure 17:
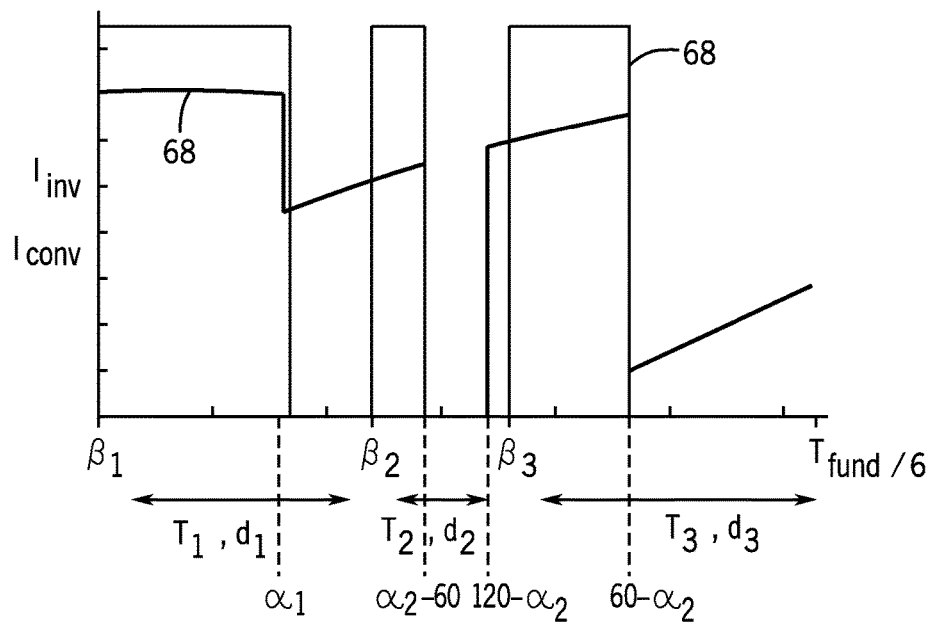

Chopping angles, $\alpha_1 = 15.42°; \alpha_2 = 87.39°$ $f_{h1} = 3*2 = 6$ $N_c = 1;$ Assuming m=3 and having the same constraints as above, it is possible to determine the optimum DC-DC converter waveform which minimizes the ripple. The SHE switching pattern is shown in FIG. 16, while FIG. 17 shows the inverter current waveform for 60° period and corresponding optimized converter current, indicated as 70 and 72, respectively.

Figure 18:
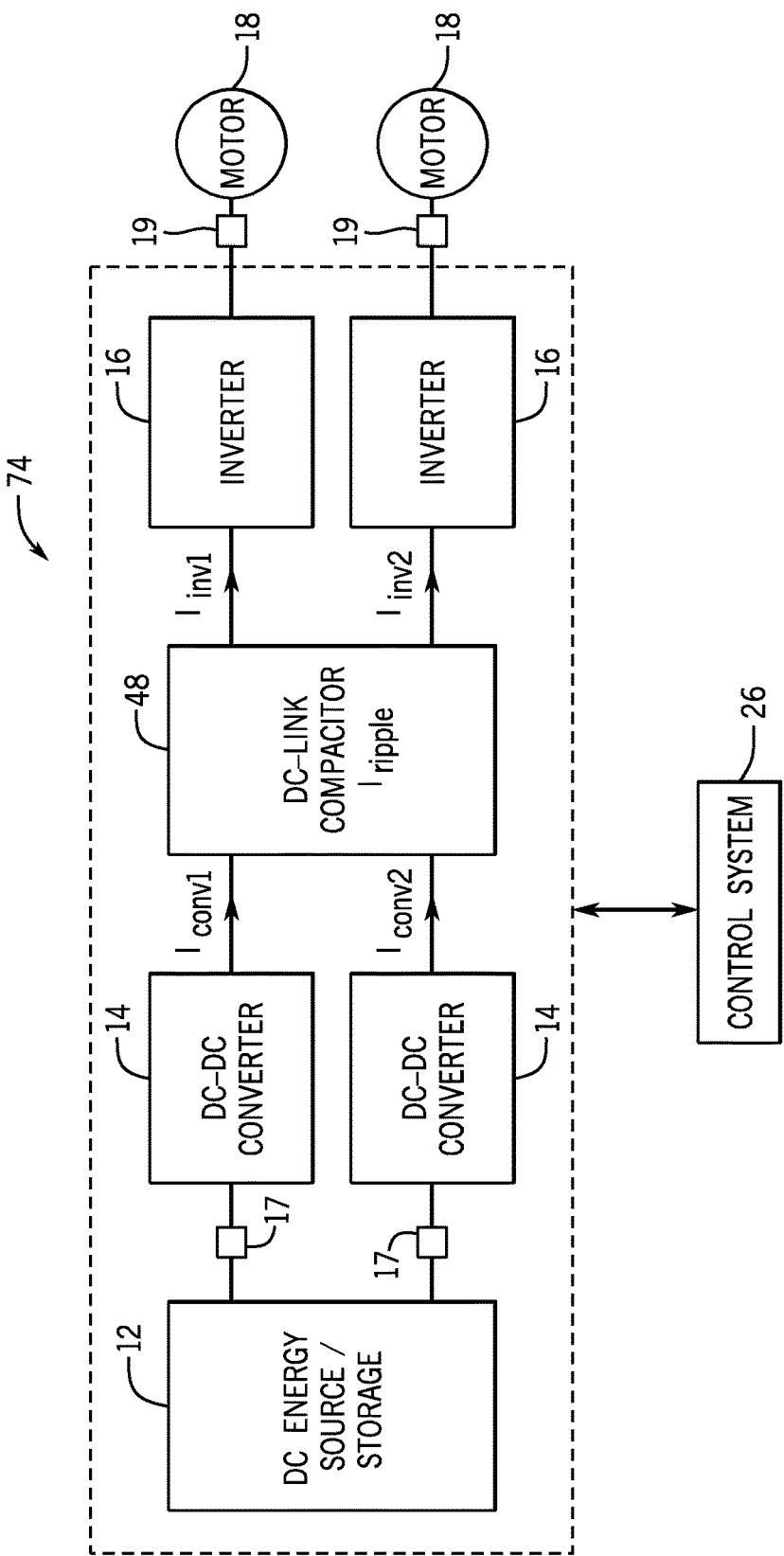
FIG. 18 is a schematic view of a traction drive system, such as for use in an electric vehicle, according to another embodiment of the invention.

While embodiments of the invention are shown and described above with respect to a traction or propulsion system that includes a single DC-DC converter, DC-AC inverter and load, it is recognized that traction/propulsion systems can include multiple DC-DC converters and/or DC-AC inverters (i.e., have multiple drive systems). That is, as shown in FIG. 18, in a system 74 where more than one DC-DC converter 14 is present, each converter 14 can have a different switching frequency and different duty ratio and different direction of power flow. One or more inverters 16 can be present in the system 74 where each operates with its own modulation scheme. The net DC link ripple current will be made up of ripple contributions from all these sources. The inverter current from all the inverters 16 can be considered as what needs to be matched by the converters 14 to minimize the DC link current. Using the optimal signal/pattern generator (via control system 26) to generate a duty ratio pattern for each of the converters 14 present, within the constraints of each converter 14, an optimal net converter current waveform can be developed which reduces the overall DC link current. Depending on the modulation schemes used and duty ratio of converters 14, implementing phase shift between DC-DC converter carriers and/or phase shift between DC-DC converter carriers and inverter carrier and/or modifying the switching frequency of DC-DC converters 14 might be adequate in reducing the ripple.

Beneficially, embodiments of the inventions thus provide a controller implemented technique for reducing DC link current ripple across a DC link capacitor in a drive system. Operation of one or more of a DC-DC converter and DC-AC inverter in the drive system is controlled to provide such reduction in the current ripple, with a switching frequency of the DC-DC converter, a DC-DC converter carrier signal phase, an AC-DC inverter carrier signal phase, and/or a duty cycle pulse pattern of the DC-DC converter being changed or altered in order to effect the reduction in the DC link capacitor current ripple.

Therefore, according to one embodiment of the present invention, a drive system coupleable to one or more DC electrical ports to condition power received from the one or more DC electrical ports or provided to the one or more DC electrical ports and coupleable to one or more AC electrical ports to condition power provided to the one or more AC electrical ports or received from the one or more AC electrical ports is provided. The drive system includes a DC link, at least one DC-DC converter electrically coupled to the DC link and to the one or more DC electrical ports to perform a DC-DC power conversion, at least one DC-AC converter electrically coupled to the DC link and to the one or more AC electrical ports to perform DC-AC power conversion and optionally perform AC-DC power conversion, a DC link capacitor electrically coupled to the DC link between the DC-DC converter and the DC-AC converter to absorb current ripple, and a control system operably connected to the DC-DC converter and the DC-AC converter, the control system configured to control operation of one or more of the at least one DC-DC converter and the at least one DC-AC converter relative to one another based on operational parameters of each of the at least one DC-DC converter and the at least one DC-AC converter, so as to reduce the current ripple across the DC link capacitor, with the operational parameters of each of the at least one DC-DC converter and the at least one DC-AC converter comprising one or more of a modulation method of the at least one DC-AC converter, a number of phases of the at least one DC-DC converter, a power factor of the one or more AC electrical ports, a duty cycle of the at least one DC-DC converter, a switching frequency of the at least one DC-DC converter, a fundamental frequency of the one or more AC electrical ports, a modulation index of the at least one DC-AC converter, and a switching frequency of the at least one DC-AC converter. In controlling operation of one or more of the at least one DC-DC converter and the at least one DC-to-AC converter, the control system controls at least one of a switching frequency of the at least one DC-DC converter, a switching frequency of the at least one DC-AC converter, a DC-DC converter carrier signal phase, a DC-AC converter carrier signal phase, and a duty cycle of the at least one DC-DC converter.

According to another embodiment of present invention, a method of operating a drive system for driving one or more AC electrical ports while reducing DC link current ripple includes operating at least one DC-DC converter electrically coupled to a DC link to modify a first DC power received from an energy source or energy storage device, so as to output a second DC power. The method also includes operating at least one DC-to-AC inverter electrically coupled to the DC link to invert the second DC power to an AC power provided to the one or more AC electrical ports and modifying the operation of one or more of the at least one DC-DC converter and the at least one DC-to-AC inverter based on operational parameters of each of the at least one DC-DC converter and the at least one DC-to-AC inverter, so as to minimize a current ripple on the DC link and across a DC link capacitor coupled to the DC link, wherein modifying the operation of one or more of the at least one DC-DC converter and the at least one DC-to-AC inverter comprises implementing one or more of: a phase shift between a DC-DC converter carrier signal and an AC-DC inverter carrier signal, modifying a switching frequency of the at least one DC-DC converter, and modifying a duty cycle of the at least one DC-DC converter.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:
1. A drive system coupleable to one or more DC electrical ports to condition power received from the one or more DC electrical ports or provided to the one or more DC electrical ports and coupleable to one or more AC electrical ports to condition power provided to the one or more AC electrical ports or received from the one or more AC electrical ports, the drive system comprising:
  a direct current (DC) link;
  at least one DC-DC converter electrically coupled to the DC link and to the one or more DC electrical ports to perform a DC-DC power conversion when receiving power from the one or more DC electrical ports or providing power to the one or more DC electrical ports;
  at least one DC-AC converter electrically coupled to the DC link and to the one or more AC electrical ports to perform DC-AC power conversion and optionally perform AC-DC power conversion;
  a DC link capacitor electrically coupled to the DC link between the DC-DC converter and the DC-AC converter to absorb current ripple; and
  a control system operably connected to the DC-DC converter and the DC-AC converter, the control system configured to control operation of one or more of the at least one DC-DC converter and the at least one DC-AC converter relative to one another based on operational parameters of each of the at least one DC-DC converter and the at least one DC-AC converter, so as to reduce the current ripple across the DC link capacitor;
  wherein the operational parameters of each of the at least one DC-DC converter and the at least one DC-AC converter comprise one or more of a modulation method of the at least one DC-AC converter, a number of phases of the at least one DC-DC converter, a power factor of the one or more AC electrical ports, a duty cycle of the at least one DC-DC converter, a switching frequency of the at least one DC-DC converter, a fundamental frequency of the one or more AC electrical ports, a modulation index of the at least one DC-AC converter, and a switching frequency of the at least one DC-AC converter; and
  wherein, in controlling operation of one or more of the at least one DC-DC converter and the at least one DC-AC converter, the control system controls at least one of a switching frequency of the at least one DC-DC converter, a switching frequency of the at least one DC-AC converter, a DC-DC converter carrier signal phase, a DC-AC converter carrier signal phase, and a duty cycle of the at least one DC-DC converter.

2. The drive system of claim 1 wherein, when the at least one DC-to-AC converter is operated according to a carrier-based, space vector pulse width modulation (PWM) scheme, the control system is configured to control the switching frequency of the at least one DC-DC converter and the carrier signal phase of the DC-DC converter or the DC-AC inverter, with the switching frequency of the at least one DC-DC converter being controlled based on the number of phases of the at least one DC-DC converter and the carrier signal phase being controlled based on the duty cycle of the at least one DC-DC converter.

3. The drive system of claim 1 wherein, when the at least one DC-to-AC converter is operated according to a discontinuous PWM scheme and the at least one DC-DC converter comprises a single phase DC-DC converter, the control system is configured to control the carrier signal phase of the DC-DC converter or the DC-AC inverter based on an interval of a fundamental current cycle of the one or more AC electrical ports, with the fundamental current cycle comprising six, sixty-degree (60°) sectors defined by a difference between a voltage angle and a modulator phase angle.

4. The drive system of claim 3 wherein the carrier signal phase of the DC-DC converter or the DC-AC converter is shifted by $\pi$ rad for first, third and fifth sectors of the fundamental current cycle and is shifted by 0 rad for second, fourth and sixth sectors of the fundamental current cycle with respect to each other.

5. The drive system of claim 1 wherein, when the at least one DC-to-AC converter is operated according to a discontinuous PWM scheme and the at least one DC-DC converter comprises a multi-phase DC-DC converter, the control system is configured to control the carrier signal phase of the DC-DC converter or the DC-AC inverter based on the duty cycle of the at least one DC-DC converter and based on an interval of a fundamental current cycle of the one or more AC electrical ports, with the fundamental current cycle comprising six, sixty-degree (60°) sectors defined by a difference between a voltage angle and a modulator phase angle.

6. The drive system of claim 5 wherein, when the duty cycle is less than 0.5, the carrier signal phase of the DC-DC converter or the DC-AC inverter is shifted by $\pi/2$ rad for first, third and fifth sectors of the fundamental current cycle and is shifted by 0 rad for second, fourth and sixth sectors of the fundamental current cycle; and
wherein, when the duty cycle is greater than 0.5, the carrier signal phase of the DC-DC converter or the DC-AC inverter is shifted by $\pi/2$ rad for second, fourth and sixth sectors of the fundamental current cycle and is shifted by 0 rad for first, third and fifth sectors of the fundamental current cycle.

7. The drive system of claim 5 wherein, when the duty cycle is less than 0.333, the carrier signal phase of the DC-DC converter or the DC-AC inverter is shifted by $\pi/3$ rad for first, third and fifth sectors of the fundamental current cycle and is shifted by 0 rad for second, fourth and sixth sectors of the fundamental current cycle;
wherein, when the duty cycle is between 0.333 and 0.666, the carrier signal phase of the DC-DC converter or the DC-AC inverter is shifted by $\pi/3$ rad for second, fourth and sixth sectors of the fundamental current cycle and is shifted by 0 rad for first, third and fifth sectors of the fundamental current cycle; and
wherein, when the duty cycle is greater than 0.666, the carrier signal phase of the DC-DC converter or the DC-AC inverter is shifted by $\pi/3$ rad for first, third and fifth sectors of the fundamental current cycle and is shifted by 0 rad for second, fourth and sixth sectors of the fundamental current cycle.

8. The drive system of claim 1 wherein, when the at least one DC-to-AC converter is operated as a six-step inverter, the control system is configured to control the DC-DC converter carrier signal phase with respect to the AC voltage based on the duty cycle of the at least one DC-DC converter and based on the power factor of the one or more AC electrical ports.

9. The drive system of claim 8 wherein, in controlling the DC-DC converter carrier signal phase, the control system is configured to implement a leading phase shift when the power factor is leading and implement a lagging phase shift when the power factor is lagging.

10. The drive system of claim 9 wherein, when the six-step inverter has a 180° conduction interval, the phase shift leads or lags by $d\pi$ for leading and lagging power factors, respectively.

11. The drive system of claim 9 wherein, when the six-step inverter has a 120° conduction interval, the control system is configured to implement a phase shift of +/−$d\pi$+ 6n$\phi$ for leading and lagging power factors, respectively.

12. The drive system of claim 1 wherein, when the at least one DC-to-AC converter is operated according to a modulation scheme with a known modulation index and fundamental frequency, the control system is configured to control a plurality of duty ratios of the at least one DC-DC converter within a 60° fundamental period and switching angles of switches in the at least one DC-DC converter, based on the one or more of a modulation method, modulation index, the fundamental frequency, the power factor of the one or more AC electrical ports, and an average duty cycle of the at least one DC-DC converter.

13. The drive system of claim 12 wherein the modulation scheme comprises one of a six-step inverter operation and a selective harmonic elimination inverter operation.

14. A method of operating a drive system for driving one or more AC electrical ports while reducing DC link current ripple, the method comprising:
operating at least one DC-DC converter electrically coupled to a DC link to modify a first DC power received from an energy source or energy storage device, so as to output a second DC power;
operating at least one DC-to-AC inverter electrically coupled to the DC link to invert the second DC power to an AC power provided to the one or more AC electrical ports; and
modifying the operation of one or more of the at least one DC-DC converter and the at least one DC-to-AC inverter based on operational parameters of each of the at least one DC-DC converter and the at least one DC-to-AC inverter, so as to minimize a current ripple on the DC link and across a DC link capacitor coupled to the DC link;
wherein modifying the operation of one or more of the at least one DC-DC converter and the at least one DC-to-AC inverter comprises implementing one or more of a phase shift between a DC-DC converter carrier signal and an AC-DC inverter carrier signal, modifying a switching frequency of the at least one DC-DC converter, and modifying a duty cycle of the at least one DC-DC converter.

15. The method of claim 14 wherein the operational parameters of each of the at least one DC-DC converter and the at least one DC-to-AC inverter comprise one or more of a modulation method of the at least one DC-AC inverter, a number of phases of the at least one DC-DC converter, a power factor of the one or more AC electrical ports, a duty cycle of the at least one DC-DC converter, a switching frequency of the at least one DC-DC converter, a fundamental frequency of the one or more AC electrical ports, a modulation index of the at least one DC-AC inverter and switching frequency of the at least one DC-AC inverter.

16. The method of claim 15 wherein, when the at least one DC-to-AC inverter is operated according to a space vector pulse width modulation (SVPWM) scheme, modifying the operation comprises modifying the switching frequency of the at least one DC-DC converter and the carrier signal phase of the DC-DC converter or the DC-AC inverter, with the switching frequency of the at least one DC-DC converter being controlled based on the number of phases of the at least one DC-DC converter and the carrier signal phase being controlled based on the duty cycle of the at least one DC-DC converter.

17. The method of claim 15 wherein, when the at least one DC-to-AC inverter is operated according to a discontinuous PWM scheme, modifying the operation comprises modifying the carrier signal phase of the DC-DC converter or the DC-AC inverter based on the duty cycle of the at least one DC-DC converter and based on an interval of a fundamental current cycle of the one or more AC electrical ports, with the fundamental current cycle comprising six, sixty-degree (60°) sectors defined by a difference between a voltage angle and a modulator phase angle.

18. The method of claim 15 wherein, when the at least one DC-to-AC inverter is operated as a six-step inverter, modifying the operation comprises controlling the DC-DC converter carrier signal phase with respect to the AC voltage based on the duty cycle of the at least one DC-DC converter and based on the power factor of the one or more AC electrical ports.

19. The method of claim 18 wherein modifying the DC-DC converter carrier signal phase comprises implementing a leading phase shift when the power factor is leading and implement a lagging phase shift when the power factor is lagging, with a size of the shift dependent on a conduction interval of the six-step inverter.

20. The method of claim 15 wherein, when the at least one DC-to-AC inverter is operated according to a modulation scheme with a known modulation index and fundamental frequency, modifying the operation comprises controlling a plurality of duty ratios of the at least one DC-DC converter within a 60° fundamental period and switching angles of switches in the at least one DC-DC converter, based on the modulation method, modulation index, the fundamental frequency, the power factor of the one or more AC electrical ports, and an average duty cycle of the at least one DC-DC converter.

* * * * *